(12) United States Patent
Tekolste et al.

(10) Patent No.: US 12,099,193 B2
(45) Date of Patent: Sep. 24, 2024

(54) VIRTUAL AND AUGMENTED REALITY SYSTEMS AND METHODS HAVING IMPROVED DIFFRACTIVE GRATING STRUCTURES

(71) Applicant: Magic Leap, Inc., Plantation, FL (US)

(72) Inventors: Robert D. Tekolste, Fort Lauderdale, FL (US); Michael A. Klug, Austin, TX (US); Paul M. Greco, Parkland, FL (US); Brian T. Schowengerdt, Seattle, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/047,210

(22) Filed: Oct. 17, 2022

(65) Prior Publication Data

US 2023/0055420 A1    Feb. 23, 2023

Related U.S. Application Data

(63) Continuation of application No. 17/209,426, filed on Mar. 23, 2021, now Pat. No. 11,487,121, which is a
(Continued)

(51) Int. Cl.
*G06T 19/00*    (2011.01)
*F21V 8/00*    (2006.01)
(Continued)

(52) U.S. Cl.
CPC ....... *G02B 27/0172* (2013.01); *G02B 5/1828* (2013.01); *G02B 5/1842* (2013.01);
(Continued)

(58) Field of Classification Search
CPC .. G02B 7/0172; G02B 5/1828; G02B 5/1842; G06T 19/006
(Continued)

(56) References Cited

U.S. PATENT DOCUMENTS 5,751,494 A    5/1998 Takahashi
5,889,567 A    3/1999 Swanson et al.
(Continued)

FOREIGN PATENT DOCUMENTS

AU    2017246864 B2    10/2017
AU    2015266670    5/2019
(Continued)

OTHER PUBLICATIONS

Foreign FOA for JP Patent Appln. No. 2021-7792 dated Dec. 7, 2022 (with English translation).
(Continued)

*Primary Examiner* — Thomas J Lett
(74) *Attorney, Agent, or Firm* — Vista IP Law Group, LLP

(57) ABSTRACT

Disclosed is an improved diffraction structure for 3D display systems. The improved diffraction structure includes an intermediate layer that resides between a waveguide substrate and a top grating surface. The top grating surface comprises a first material that corresponds to a first refractive index value, the underlayer comprises a second material that corresponds to a second refractive index value, and the substrate comprises a third material that corresponds to a third refractive index value.

18 Claims, 30 Drawing Sheets

Related U.S. Application Data continuation of application No. 16/868,826, filed on May 7, 2020, now Pat. No. 11,009,710, which is a continuation of application No. 16/573,120, filed on Sep. 17, 2019, now Pat. No. 10,732,417, which is a continuation of application No. 15/896,438, filed on Feb. 14, 2018, now Pat. No. 10,466,486, which is a continuation of application No. 15/007,117, filed on Jan. 26, 2016, now Pat. No. 9,915,826.

(60) Provisional application No. 62/107,977, filed on Jan. 26, 2015.

(51) Int. Cl.
  *G02B 5/18* (2006.01)
  *G02B 27/01* (2006.01)
  *G02B 27/42* (2006.01)

(52) U.S. Cl.
  CPC ........ *G02B 6/0011* (2013.01); *G02B 27/4205* (2013.01); *G06T 19/006* (2013.01); *G02B 2027/0105* (2013.01); *G02B 2027/0107* (2013.01); *G02B 2027/0123* (2013.01); *G02B 2027/0174* (2013.01)

(58) Field of Classification Search
  USPC .......................................................... 345/633
  See application file for complete search history.

(56) References Cited

U.S. PATENT DOCUMENTS

| | | | |
|---|---|---|---|
| 6,120,538 | A | 9/2000 | Rizzo, III et al. |
| 6,215,928 | B1 | 4/2001 | Friesem et al. |
| 7,077,523 | B2 | 7/2006 | Seo et al. |
| 7,428,001 | B2 | 9/2008 | Schowengerdt et al. |
| 7,616,382 | B2 | 11/2009 | Inoguchi et al. |
| 8,248,458 | B2 | 8/2012 | Schowengerdt et al. |
| 8,259,164 | B2 | 9/2012 | Saito et al. |
| 8,317,330 | B2 | 11/2012 | Yamazaki et al. |
| 8,384,999 | B1 | 2/2013 | Crosby et al. |
| 9,740,006 | B2 | 8/2017 | Gao |
| 9,791,700 | B2 | 10/2017 | Schowengerdt |
| 9,915,826 | B2 | 3/2018 | Tekolste et al. |
| 10,156,722 | B2 | 12/2018 | Gao et al. |
| 10,466,486 | B2 | 11/2019 | Tekolste et al. |
| 2004/0109234 | A1 | 6/2004 | Levola |
| 2004/0227703 | A1 | 11/2004 | Lamvik et al. |
| 2006/0012851 | A1 | 1/2006 | Wu et al. |
| 2008/0018555 | A1 | 1/2008 | Kuo et al. |
| 2009/0129116 | A1 | 5/2009 | Kim et al. |
| 2010/0039707 | A1 | 2/2010 | Akahane et al. |
| 2010/0289970 | A1 | 11/2010 | Watanabe |
| 2011/0051226 | A1 | 3/2011 | Vallius et al. |
| 2011/0075257 | A1 | 3/2011 | Hua et al. |
| 2011/0109823 | A1 | 5/2011 | Galstian et al. |
| 2012/0081800 | A1 | 4/2012 | Cheng et al. |
| 2012/0162549 | A1 | 6/2012 | Gao et al. |
| 2012/0192991 | A1 | 8/2012 | Gupta et al. |
| 2013/0022222 | A1 | 1/2013 | Zschau et al. |
| 2013/0050832 | A1 | 2/2013 | Tohara et al. |
| 2013/0082905 | A1 | 4/2013 | Ranieri et al. |
| 2013/0135299 | A1 | 5/2013 | Park et al. |
| 2013/0187836 | A1 | 7/2013 | Cheng et al. |
| 2013/0250430 | A1 | 9/2013 | Robbins et al. |
| 2013/0300635 | A1 | 11/2013 | White et al. |
| 2013/0314793 | A1* | 11/2013 | Robbins ............. G02B 27/0172 359/630 |
| 2014/0009845 | A1 | 1/2014 | Cheng et al. |
| 2014/0071539 | A1 | 3/2014 | Gao |
| 2014/0232651 | A1 | 8/2014 | Kress et al. |
| 2014/0266986 | A1 | 9/2014 | Magyari |
| 2014/0266990 | A1 | 9/2014 | Makino et al. |
| 2014/0300966 | A1 | 10/2014 | Travers et al. |
| 2014/0327771 | A1 | 11/2014 | Malachowsky et al. |
| 2014/0340389 | A1 | 11/2014 | Lanman et al. |
| 2015/0016777 | A1 | 1/2015 | Abovitz et al. |
| 2015/0062345 | A1 | 3/2015 | Kusanagi |
| 2015/0116721 | A1 | 4/2015 | Kats et al. |
| 2015/0130995 | A1 | 5/2015 | Nishiyama et al. |
| 2015/0205126 | A1 | 7/2015 | Schowengerdt |
| 2015/0219842 | A1 | 8/2015 | Sqalli et al. |
| 2015/0234191 | A1 | 8/2015 | Schowengerdt |
| 2015/0234205 | A1 | 8/2015 | Schowengerdt |
| 2015/0248012 | A1 | 9/2015 | Schowengerdt |
| 2015/0260992 | A1 | 9/2015 | Luttmann et al. |
| 2015/0268467 | A1 | 9/2015 | Cakmakci et al. |
| 2015/0277129 | A1 | 10/2015 | Hua et al. |
| 2015/0309263 | A2 | 10/2015 | Abovitz et al. |
| 2015/0319430 | A1 | 11/2015 | Lapstun |
| 2015/0346490 | A1 | 12/2015 | Tekolste et al. |
| 2015/0346495 | A1 | 12/2015 | Welch et al. |
| 2016/0011419 | A1 | 1/2016 | Gao |
| 2016/0139402 | A1 | 5/2016 | Lapstun |
| 2017/0160548 | A1 | 6/2017 | Woltman |
| 2017/0293141 | A1 | 10/2017 | Schowengerdt et al. |
| 2018/0172998 | A1 | 6/2018 | Tekolste et al. |
| 2019/0018247 | A1 | 1/2019 | Gao et al. |
| 2020/0176714 | A1 | 6/2020 | Fusella et al. |

FOREIGN PATENT DOCUMENTS

| | | |
|---|---|---|
| AU | 2021250895 B2 | 10/2023 |
| CN | 104360484 | 2/2015 |
| DE | 10 2007 021036 | 11/2008 |
| JP | 2002-116410 | 4/2002 |
| JP | 2002-196280 | 7/2002 |
| JP | 2004-252429 | 9/2004 |
| JP | 2006-3872 | 1/2006 |
| JP | 2007-505352 | 3/2007 |
| JP | 2007-101790 | 4/2007 |
| JP | 2009-169142 | 7/2009 |
| JP | 2009-186794 | 8/2009 |
| JP | 2010-039219 | 2/2010 |
| JP | 2010-139621 | 6/2010 |
| JP | 2010-204397 | 9/2010 |
| JP | 2011-077764 | 4/2011 |
| JP | 2014-505381 | 2/2014 |
| JP | 2014-092696 | 5/2014 |
| JP | 2014-132328 | 7/2014 |
| JP | 2014-222302 | 11/2014 |
| WO | WO 02/086590 | 10/2002 |
| WO | WO 2005/024491 | 3/2005 |
| WO | WO 2008071830 | 6/2008 |
| WO | WO 2011134169 | 11/2011 |
| WO | WO 2013/049248 | 4/2013 |
| WO | WO 2013/162977 | 10/2013 |
| WO | WO 2014053194 | 4/2014 |
| WO | WO 2014062912 | 4/2014 |
| WO | WO 2014064228 | 5/2014 |
| WO | WO 2015184409 | 12/2015 |
| WO | WO 2017176861 | 10/2017 |

OTHER PUBLICATIONS

Foreign Response for CA Patent Appln. No. 2975234 dated Nov. 18, 2022.

Foreign Exam Report for AU Patent Appln. No. 2021250895 dated Nov. 3, 2022.

Foreign Response for KR Patent Appln. No. 10-2022-7016215 dated Jul. 6, 2023.

Foreign Examiner's Report for CA Patent Appln. No. 3201563 dated Aug. 11, 2023.

Foreign Exam Report for AU Patent Appln. No. 2021250895 dated Sep. 7, 2023.

Foreign NOA for JP Patent Appln. No. 2021-7792 dated May 19, 2023.

Foreign NOA for IL Patent Appln. No. 297803 dated Mar. 16, 2023 in English.

Hua, et al. "An Optical See-through Multi-Focal-Plane Stereoscopic Display Prototype Enabling Nearly-Correct Focus Cues," Stereo-

(56) References Cited

OTHER PUBLICATIONS scopic Displays and Applications XXIV, Proc. of SPIE—IS&T Electronic Imaging, SPIE vol. 8648, 86481A, Mar. 12, 2013. doi: 10.1117/12.2005117.
Hu, Xinda. "Development of the Depth-Fused Multi-Focal-Plane Display Technology," The University of Arizona, 2014.
Cheng, et al. "Design of a wide-angle, lightweight head-mounted display using free-form optics tiling," Optics Letters, vol. 36, No. 11, Jun. 1, 2011, 2098-2100.
Cheng, et al. "Light field head-mounted display with correct focus cue using micro structure array," Chinese Optics Letters, 12(6), Jun. 10, 2014, 060010.
Hu, et al. "High-resolution optical see-through multi-focal-plane head-mounted display using freeform optics," Optics Express, 22 (11), Jun. 2, 2014, 13896-13903. DOI: 10.1364/OE.22.013896.
Hu, et al. "A depth-fused multi-focal-plane display prototype enabling focus cues in stereoscopic displays," SID 11 Digest, 2011, 691-694.
Hu, et al. "Design of an optical see-through multi-focal-plane stereoscopic 3D display using freeform prisms," FiO/LS Technical Digest, 2012.
Hu, et al. "Design and assessment of a depth fused multi-focal-plane display prototype," Journal of display technology, 10 (4), Apr. 2014, 308-316.
PCT International Search Report and Written Opinion for International Appln. No. PCT/US15/33412, Applicant Magic Leap, Inc., forms PCT/ISA/210, 220, and 237, dated Oct. 26, 2015 (13 pages).
Non-Final Office Action for U.S. Appl. No. 14/726,396 dated Mar. 15, 2017.
Final Office Action for U.S. Appl. No. 14/726,396 dated Aug. 16, 2017.
Restriction Requirement for U.S. Appl. No. 14/726,396 dated Sep. 1, 2017.
Response to Non-Final Office Action dated Jun. 15, 2017 for U.S. Appl. No. 14/726,396.
Response to Restriction Election dated Feb. 21, 2017 for U.S. Appl. No. 14/726,396.
PCT International Search Report and Written Opinion for International Appln. No. PCT/US2017/26102, Applicant Magic Leap, Inc., forms PCT/ISA/210, 220, and 237, dated Jun. 26, 2017 (9 pages).
PCT International Search Report and Written Opinion of the ISA (corrected version) mailed Apr. 21, 2016, for PCT/US2016/14988, Applicant Magic Leap, Inc., dated Apr. 8, 2016 (13 pages).
Notice of Allowance for U.S. Appln. No. 15/007, 117 dated Oct. 19, 2017.
Non-Final Office Action for U.S. Appln. No. 15/007,117 dated Apr. 6, 2017.
Response to Non-Final Office Action dated Jun. 30, 2017 for U.S. Appl. No. 15/007,117.
Response to Final Office Action filed Nov. 16, 2017 for U.S. Appl. No. 14/726,396.
Non-Final Office Action for U.S. Appl. No. 14/726,396 dated Dec. 21, 2017.
Extended European Search Report mailed Jan. 18, 2018 for EP application No. 15799569.7, Applicant Magic Leap, Inc. 6 pages.
Amendment after Non-Final Office Action for U.S. Appl. No. 14/726,396 dated Mar. 21, 2018.
Non-Final Office Action mailed Mar. 27, 2018 for U.S. Appl. No. 15/479,700.
Amendment after Non-Final Office Action for U.S. Appl. No. 15/479,700 dated Jun. 27, 2018.
Notice of Allowance for U.S. Appl. No. 14/726,396 dated Jul. 2, 2018.
Notice of Allowance for U.S. Appl. No. 15/896,438 dated Jul. 31, 2018.
Response to Extended European Search Report filed Aug. 14, 2018 for EP application No. 15799569.7, Applicant Magic Leap, Inc. 11 pages.
Extended European Search Report dated Aug. 23, 2018 for EP application No. 16743992.6, Applicant Magic Leap, Inc. 8 pages.
Machine generated translation of Foreign Patent No. DE 10 2007 02136, granted Nov. 6, 2008, translation prepared Aug. 21, 2018, 21 pages.
Notice of Allowance for U.S. Appl. No. 14/726,396 dated Sep. 28, 2018.
Non-Final Office Action for U.S. Appl. No. 15/896,438 dated Nov. 2, 2018.
Final Office Action for U.S. Appl. No. 15/479,700 dated Nov. 2, 2018.
Office action mailed Sep. 7, 2018 for AU Application No. 2015266670.
Office action mailed Feb. 2, 2018 for Chinese Application No. 201580041059.8, in Chinese with English Translation from foreign associate.
Response to Office Action filed Jun. 13, 2018 for Chinese application No. 201580041059.8, in Chinese language with claims in English.
Office action dated Oct. 15, 2018 for Chinese application No. 201580041059.8, in Chinese language with a translation provided by the foreign associate.
Response to 2nd Office Action filed Dec. 25, 2018 for Chinese application No. 201580041059.8, in Chinese language.
RCE and Response to Office Action for U.S. Appl. No. 15/479,700, filed Feb. 4, 2019.
Office action dated Jan. 15, 2019 for Israeli application No. 249091, in Israeli language with translation provided by foreign associate.
Non-Final Office Action dated Feb. 19, 2019 for U.S. Appl. No. 15/479,700.
Response to Office Action filed Mar. 4, 2019 for U.S. Appl. No. 15/896,438.
Response to Extended European Search Report filed Mar. 18, 2019 for European Patent Application No. 16743992.6, Applicant Magic Leap, Inc. 12 pages.
Response to Examination Report filed Mar. 22, 2019 for Australian application No. 2015266670.
Extended European Search Report dated Mar. 26, 2019 for European Application No. 17779729.7, Applicant Magic Leap, Inc. 10 pages.
Office Action mailed Apr. 1, 2019 for Japanese Application No. 2016-570034 with English Translation from foreign associate.
Notice of Acceptance dated Apr. 26, 2019 for AU Appln.No. 2015266670.
Response to OA filed May 13, 2019, for Israeli application No. 249091, in Israeli language with translation provided by foreign associate.
Response to Office Action for U.S. Appl. No. 15/479,700, filed May 20, 2019.
Response to 1st Office Action filed Jun. 11, 2019 for Japanese application No. 2016-570034, in Japanese language only.
Office action dated Jun. 4, 2019 for Chinese application No. 201580041059.8, in Chinese language with a translation provided by the foreign associate.
Response to OA filed Aug. 14, 2019 for Chinese Patent Application No. 201580041059.8, in Chinese language only with translation of amended claims in English, 80 pages.
Office Action mailed Aug. 1, 2019 for Japanese Application No. 2016-570034, in Japanese with English Translation from foreign associate, 4 pages.
Final Office Action dated Sep. 6, 2019 for U.S. Appl. No. 15/479,700.
Examination Report for New Zealand Application No. 727361 dated Sep. 13, 2019, 3 pages.
Office action dated Aug. 15, 2019, for Chinese application No. 201680018144.7, in Chinese language with an English translation provided by the foreign associate, (11 pages).
Response to Extended European Search Report filed Oct. 21, 2019 for European application No. 17779729.7, Applicant Magic Leap, Inc. (9 pages).
Examination Report for New Zealand Application No. 734573 dated Nov. 14, 2019, 2 pages.
Response to Office action filed Dec. 13, 2019, for Chinese application no. 201680018144.7, in Chinese language No. English translation, (4 pages).

(56) References Cited

OTHER PUBLICATIONS

Office Action mailed Dec. 13, 2019 for Japanese Application No. 2017-539020, in Japanese with English Translation from foreign associate, 8 pages.
Office action dated Dec. 12, 2019 for Chinese application No. 201580041059.8, in Chinese language with a translation provided by the foreign associate, 8 pages.
Notice of Allowance for Japanese Appln. No. 2016-570034 dated Jan. 8, 2020.
Examination Report for Australian Application No. 2016211623 dated Jan. 3, 2020, 2 pages.
Non-Final Office Action mailed Mar. 6, 2020 for U.S. Appl. No. 15/479,700.
Foreign Office Action for Chinese Patent Appln. No. 201780021552.2 dated Feb. 6, 2020.
Response to First Examination Report for New Zealand Application No. 727361 dated Mar. 9, 2020.
Notice of Allowance for U.S. Appl. No. 16/573,120 dated Apr. 15, 2020.
Amendment Response for U.S. Appl. No. 15/479,700 dated Jul. 2, 2020.
Foreign Office Action for Korean Patent Appln. No. 10-2016-7036875 dated Jul. 20, 2020.
Foreign Examiner's Report for AU Patent Appln. No. 2020204550 dated Jul. 13, 2020.
Foreign Office Action for CN Patent Appln. No. 201780021552.2 dated Jul. 15, 2020.
Foreign Office Action for JP Patent Application No. 2020-132801 dated Sep. 9, 2020.
Foreign OA Response for KR Patent Appln. No. 10-2016-7036875 dated Sep. 18, 2020.
Foreign Office Action for JP Patent Application No. 2019-108514 dated Sep. 2, 2020.
Foreign OA Response for CN Patent Appln. No. 201780021552.2 dated Sep. 27, 2020.
Notice of Allowance for U.S. Appl. No. 16/868,826 dated Oct. 9, 2020.
Foreign Office Action for JP Patent Appln. No. 2019-65723 dated Sep. 28, 2020.
Foreign Notice of Allowance for KR Patent Appln. No. 10-2016-7036875 dated Oct. 14, 2020.
Foreign 1st Exam Report for NZ Patent Appln. No. 762952 dated Oct. 1, 2020.
Final Office Action for U.S. Appl. No. 15/479,700 dated Oct. 27, 2020.
1st Patent Exam Report for NZ Patent Appln. No. 762432 dated Sep. 4, 2020.
First Exam Report for AU Patent Appln. No. 2019213313 dated Sep. 8, 2020.
Foreign OA Response for JP Patent Application No. 2019-108514 dated Nov. 25, 2020.
Non-Final Office Action for U.S. Appl. No. 16/123,711 dated Nov. 25, 2020.
Foreign OA Response for JP Patent Application No. 2020-132801 dated Dec. 1, 2020.
Foreign Notice of Allowance for JP Patent Appln. No. 2020-132801 dated Dec. 18, 2020.
Foreign Notice of Allowance for JP Patent Appln. No. 2019-108514 dated Dec. 28, 2020.
Notice of Allowance for U.S. Appl. No. 16/868,826 dated Dec. 24, 2020.
Foreign OA for CN Patent Appln. No. 201780021552.2 dated Dec. 11, 2020.
Foreign OA for IN Patent Appln. No. 201847038959 dated Jan. 29, 2021.
Notice of Allowance for U.S. Appl. No. 15/479,700 dated Feb. 12, 2021.
Foreign OA for KR Patent Appln. No. 10-2017-7023982 dated Feb. 19, 2021.
Foreign Response for CN Patent Appln. No. 201780021552.2 dated Feb. 22, 2021.
Amendment Response for U.S. Appl. No. 16/123,711 dated Feb. 25, 2021.
Foreign Exam Report for CA Patent Appln. No. 2950425 dated Feb. 9, 2021.
Foreign Office Action for IL Patent Appln. No. 253732 dated Dec. 21, 2020.
Foreign OA for JP Patent Appln. No. 2018-552061 dated Mar. 3, 2021.
Foreign Response for NZ Patent Appln. No. 762952 dated Mar. 26, 2021.
Foreign Response for NZ Patent Appln. No. 762432 dated Apr. 1, 2021.
Foreign Response for AU Patent Appln. No. 2019213313 dated Apr. 12, 2021.
Foreign Response for KR Patent Appln. No. 10-2017-7023982 dated Apr. 12, 2021.
Foreign Response for IL Patent Appln. No. 253732 dated Apr. 20, 2021.
Foreign 2nd Exam Report for NZ Patent Appln. No. 762952 dated Mar. 30, 2021.
Final Office Action for U.S. Appl. No. 16/123,711 dated Apr. 23, 2021.
Foreign NOA for IL Patent Appln. No. 253732 dated Apr. 27, 2021.
Foreign NOA for KR Patent Appln. No. 10-2017-7023982 dated Apr. 21, 2021.
Foreign Decision of Rejection for CN Patent Appln. No. 201780021552.2 dated Apr. 1, 2021.
Foreign Response for CA Patent Appln. No. 2950425 dated May 14, 2021.
Foreign OA for IN Patent Appln. No. 201747028773 dated Dec. 30, 2020.
Foreign Exam Report for AU Patent Appln. No. 2017246864 dated May 14, 2021.
Foreign Response for JP Patent Appln. No. 2018-552061 dated May 25, 2021.
Foreign OA for CN Patent Appln. No. 202010626647.0 dated Apr. 16, 2021.
Foreign Response for AU Patent Appln. No. 2020204550 Jun. 25, 2021.
Foreign Response for IL Patent Appln. No. 274429 dated Jun. 29, 2021.
Foreign Response for CN Patent Appln. No. 201780021552.2 dated Jul. 16, 2021.
Foreign Response for IN Patent Appln. No. 201847038959 dated Jul. 21, 2021.
Foreign Response for CN Patent Appln. No. 202010626647.0 dated Sep. 1, 2021.
Foreign NOA for CA Patent Appln. No. 2950425 dated Aug. 20, 2021.
Non-Final Office Action for U.S. Appl. No. 16/123,711 dated Sep. 14, 2021.
Foreign Exam Report for EP Patent Appln. No. 15799569.7 dated Sep. 10, 2021.
Foreign FOA for JP Patent Appln. No. 2018-552061 dated Sep. 15, 2021 with English translation.
Foreign OA for KR Patent Appln. No. 10-2018-7032129 dated Oct. 20, 2021.
Foreign OA for CN Patent Appln. No. 202010626647.0 dated Nov. 3, 2021.
Foreign OA for CN Patent Appln. No. 202010626648.5 dated Nov. 1, 2021.
Amendment Response to NFOA for U.S. Appl. No. 16/123,711 dated Dec. 7, 2021.
Foreign Response for AU Patent Appln. No. 2017246864 dated Dec. 10, 2021.
Foreign OA for KR Patent Appln. No. 10-2021-7023212 dated Dec. 10, 2021.
Foreign OA for JP Patent Appln. No. 2021-007792 dated Dec. 2, 2021.
Foreign Response for KR Patent Appln. No. 10-2018-7032129 dated Dec. 16, 2021.

(56) References Cited

OTHER PUBLICATIONS

Foreign Notice of Appeal with Response for JP Patent Appln. No. 2018-552061 dated Dec. 21, 2021.
Foreign OA for JP Patent Appln. No. 2021-5068 dated Dec. 14, 2021.
Foreign Response and Written Submission for IN Patent Appln. No. 201747028773 dated Dec. 30, 2021.
Foreign Response for CN Patent Appln. No. 202010626647.0 dated Jan. 6, 2022.
Foreign Response for EP Patent Appln. No. 15799569.7 dated Jan. 18, 2022.
Foreign Exam Report for AU Patent Appln. No. 2017246864 dated Jan. 11, 2022.
Foreign OA for IL Patent Appln. No. 261829 dated Dec. 12, 2021.
Foreign Exam Report for CA Patent Appln. No. 2975234 dated Jan. 18, 2022.
Final Office Action for U.S. Appl. No. 16/123,711 dated Feb. 8, 2022.
Foreign NOA for KR Patent Appln. No. 10-2018-7032129 dated Feb. 8, 2022.
Foreign Response for KR Patent Appln. No. 10-2021-7023212 dated Feb. 8, 2022.
Foreign Response for JP Patent Appln. No. 2021-7792 dated Feb. 17, 2022.
Foreign FOA for KR Patent Appln. No. 10-2018-7032129 dated Feb. 8, 2022 (English Traslation).
Foreign Exam Report for EP Patent Appln. No. 17779729.7 dated Feb. 2, 2022.
Foreign NOA for KR Patent Appln. No. 10-2021-7023212 dated Feb. 14, 2022.
Foreign NOA for JP Patent Appln. No. 2018-552061 dated Mar. 8, 2022.
Foreign NOA for CN Patent Appln. No. 202010626647.0 dated Feb. 23, 2022.
Foreign Response for CN Patent Appln. No. 202010626648.5 dated Mar. 9, 2022.
Foreign Exam Report for EP Patent Appln. No. 16743992.6 dated Feb. 17, 2022.
Foreign Response for JP Patent Appln. No. 2021-5068 dated Mar. 11, 2022.
Foreign Response for KR Patent Appln. No. 10-2018-7032129 dated Mar. 10, 2022.
Foreign Response for AU Patent Appln. No. 2017246864 dated Mar. 24, 2022.
Foreign NOA for IL patent Appln. No. 274429 dated Feb. 16, 2022.
Foreign Notice of Acceptance for AU Patent Appln. No. 2017246864 dated Apr. 4, 2022.
Foreign NOA for CN Patent Appln. No. 202010626648.5 dated Apr. 15, 2022.
Amendment Response to FOA for U.S. Appl. No. 16/123,711 dated May 6, 2022.
Foreign Response for CA Patent Appln. No. 2975234 dated May 18, 2022.
Foreign Exam Report for NZ Patent Appln. No. 746486 dated May 10, 2022.
Notice of Allowance for U.S. Appl. No. 16/123,711 dated May 27, 2022.
Foreign Response for EP Patent Appln. No. 17779729.7 dated Jun. 7, 2022.
Foreign Response for EP Patent Appln. No. 16743992.6 dated Jun. 15, 2022.
Notice of Allowance for U.S. Appl. No. 17/209,426 dated Jun. 27, 2022.
Foreign OA for JP Patent Appln. No. 2021-7792 dated Jun. 6, 2022 with English translation.
Foreign FOA for JP Patent Appln. No. 2021-5068 dated Jun. 22, 2022 with English translation.
Foreign Exam Report for CA Patent Appln. No. 2975234 dated Jul. 26, 2022.
Foreign Response for IL Patent Appln. No. 261829 dated Aug. 14, 2022.
Foreign Notification Prior to Acceptance for IL Patent Appln. No. 285033 dated Aug. 2, 2022.
Non-Final Office Action for U.S. Appl. No. 17/318,061 dated Mar. 13, 2023.
Foreign Exam Report for CA Patent Appln. No. 3141963 dated Jan. 17, 2022.
Foreign Notice of Reexamination for CN Patent Appln. No. 201780021552.2 dated Feb. 3, 2023 (with English translation).
Foreign NOA for CA Patent Appln. No. 2975234 dated Feb. 6, 2023.
Foreign OA for JP Patent Appln. No. 2021-5068 dated Sep. 8, 2023 (with English translation).
Non-Final Office Action for U.S. Appl. No. 17/318,061 dated Oct. 12, 2023.
Foreign OA for JP Patent Appln. No. 2022-169020 dated Sep. 28, 2023.
Foreign NOA for IL Patent Appln. No. 261829 dated Aug. 31, 2022.
Foreign Response for NZ Patent Appln. No. 746486 dated Nov. 10, 2022.
Foreign OA for KR Patent Appln. No. 10-2022-7016215 dated May 18, 2023.
Foreign Response to EP Patent Appln. No. 15799569.7 dated Nov. 2, 2023.
Foreign OA for KR Patent Appln. No. 10-2022-7016215 dated Nov. 8, 2023.
Amendment Response to NFOA for U.S. Appl. No. 17/318,061 dated Jun. 13, 2023.
Foreign Exam Report for EP Patent Appln. No. 15799569.7 dated Apr. 21, 2023.
Foreign NOA for EP Patent Appln. No. 15799569.7 dated Mar. 4, 2024.
Foreign OA for JP Patent Appln. No. 2021-5068 dated Feb. 29, 2024 (with English translation).
Foreign Response for JP Patent Appln. No. 2023-61318 dated Mar. 25, 2024.
Foreign NOA for IL Patent Appln. No. 303820 dated Nov. 6, 2023 in English.
Foreign Response for JP Patent Appln. No. 2021-5068 dated Nov. 20, 2023.
Foreign Response for CA Patent Appln. No. 3201563 dated Dec. 7, 2023.
Foreign Exam Report for CA Patent Appln. No. 3018782 dated Dec. 13, 2023.
Foreign Response for KR Patent Appln. No. 10-2022-7016215 dated Jan. 4, 2024.
Foreign OA for JP Patent Appln. No. 2023-61318 dated Dec. 28, 2023.
Foreign NOA for CA Patent Appln. No. 3201563 dated Jan. 11, 2014.
Foreign NOA for EP Patent Appln. No. 16743992.6 dated Dec. 8, 2023.
Foreign NOA for EP Patent Appln. No. 17779729.7 dated dated Jan. 15, 2024.
Foreign NOA for AU Patent Appln. No. 2021250895 dated Oct. 6, 2023.
Foreign OA for JP Patent Appln. No. 2022-169020 dated Apr. 10, 2024.
Notice of Allowance for U.S. Appl. No. 17/318,061 dated May 1, 2024.
Foreign OA for JP Patent Appln. No. 2022-169020 dated Mar. 27, 2024.
Foreign Response for CA Patent Appln. No. 3018782 dated Apr. 5, 2024.
Foreign Response for JP Patent Appln. No. 2021-5068 dated Jun. 3, 2024.
Foreign OA for JP Patent Appln. No. 2023-61318 dated May 21, 2024 (with English translation).
Extended European Search Report for EP Patent Appln. No. 24165265.0 dated Jun. 26, 2024.
Non-Final Office Action for U.S. Appl. No. 17/893,343 dated Jun. 21, 2024.

(56) References Cited

OTHER PUBLICATIONS

Foreign NOA for KR Patent Appln. No. 10-2022-7016215 dated Jun. 18, 2024.
Foreign NOA for JP Patent Appln. No. 2021-5068 dated Jul. 9, 2024.

\* cited by examiner

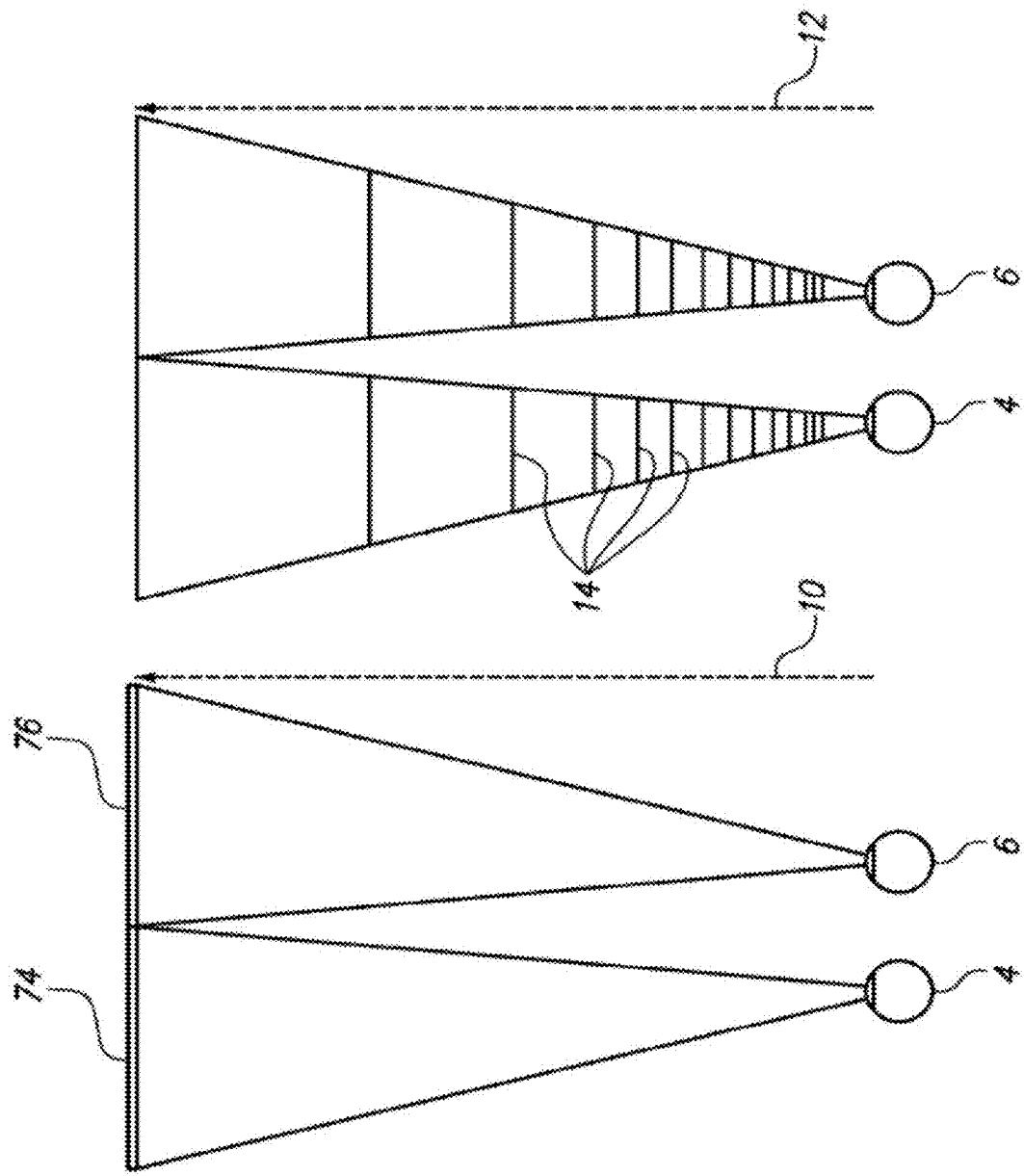

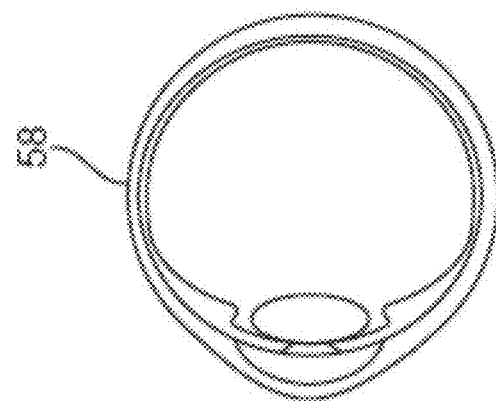
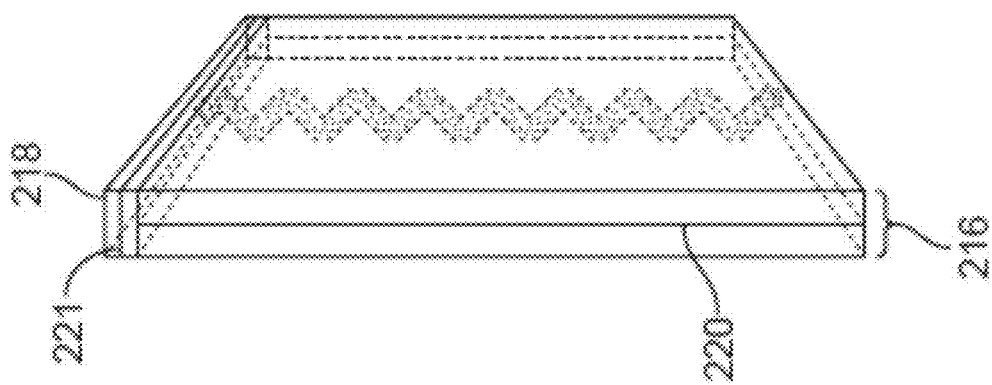
Fig. 7

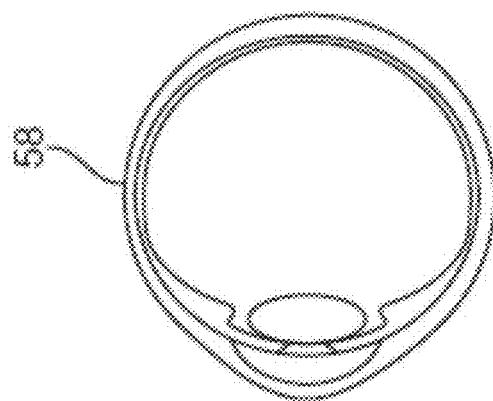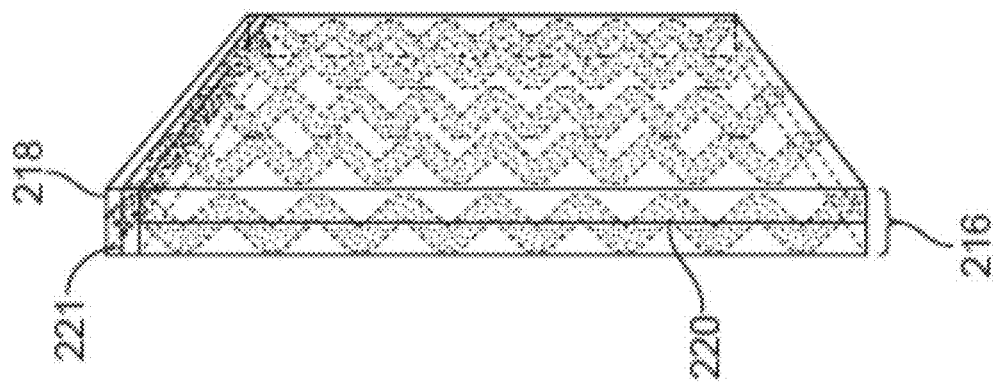
Fig. 10

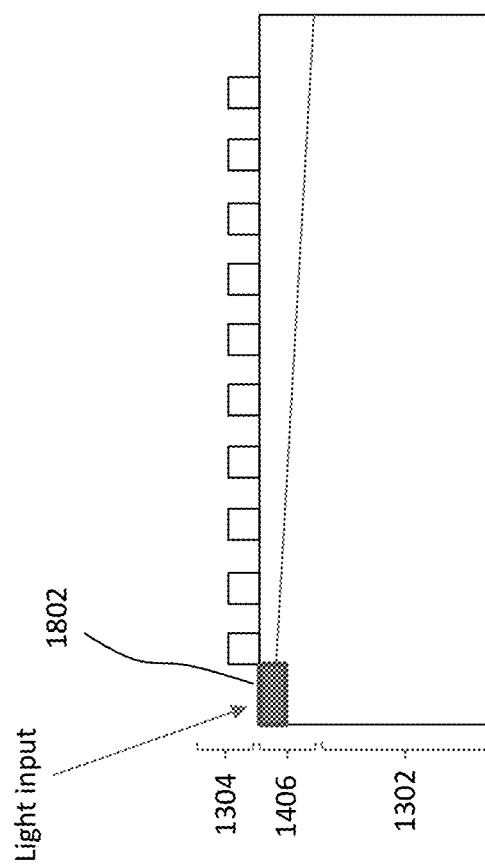

VIRTUAL AND AUGMENTED REALITY SYSTEMS AND METHODS HAVING IMPROVED DIFFRACTIVE GRATING STRUCTURES

CROSS-REFERENCE TO RELATED APPLICATION(S)

The present application is a continuation of U.S. patent application Ser. No. 17/209,426 filed on Mar. 23, 2021 entitled "VIRTUAL AND AUGMENTED REALITY SYSTEMS AND METHODS HAVING IMPROVED DIFFRACTIVE GRATING STRUCTURES," which is a continuation of U.S. patent application Ser. No. 16/868,826 filed on May 7, 2020 entitled "VIRTUAL AND AUGMENTED REALITY SYSTEMS AND METHODS HAVING IMPROVED DIFFRACTIVE GRATING STRUCTURES," which is a continuation of Ser. No. 16/573,120, filed on Sep. 17, 2019 entitled "VIRTUAL AND AUGMENTED REALITY SYSTEMS AND METHODS HAVING IMPROVED DIFFRACTIVE GRATING STRUCTURES," which is a continuation of U.S. patent application Ser. No. 15/896,438, filed on Feb. 14, 2018 entitled "VIRTUAL AND AUGMENTED REALITY SYSTEMS AND METHODS HAVING IMPROVED DIFFRACTIVE GRATING STRUCTURES," which is a continuation of U.S. patent application Ser. No. 15/007,117, filed on Jan. 26, 2016 entitled "VIRTUAL AND AUGMENTED REALITY SYSTEMS AND METHODS HAVING IMPROVED DIFFRACTIVE GRATING STRUCTURES," which claims the benefit of U.S. Provisional Patent Application Ser. No. 62/107,977, filed on Jan. 26, 2015 entitled "VIRTUAL AND AUGMENTED REALITY SYSTEMS AND METHODS". The present application is related to U.S. Provisional Patent Application Ser. No. 61/909,774 filed on Nov. 27, 2013 and U.S. Utility patent application Ser. No. 14/555,585 filed on Nov. 27, 2014. The contents of the above-referenced patent applications are hereby expressly and fully incorporated by reference in their entirety, as though set forth in full. Described in the aforementioned incorporated patent applications are various embodiments of augmented reality configurations wherein diffractive optical elements (DOE) and patterns are utilized to create inbound light fields for perception by the human vision system. Described herein are further embodiments of diffractive grating structures and disclosure regarding their associated optical performance and fabrication.

FIELD OF THE INVENTION

The present disclosure relates to virtual reality and augmented reality imaging and visualization systems.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to actual real-world visual input. An augmented reality, or "AR", scenario typically involves presentation of digital or virtual image information as an augmentation to visualization of the actual world around the user. For example, referring to FIG. 1, an augmented reality scene (4) is depicted wherein a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

There are numerous challenges when it comes to presenting 3D virtual content to a user of an AR system. A central premise of presenting 3D content to a user involves creating a perception of multiple depths. In other words, it may be desirable that some virtual content appear closer to the user, while other virtual content appear to be coming from farther away. Thus, to achieve 3D perception, the AR system should be configured to deliver virtual content at different focal planes relative to the user.

In order for a 3D display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human visual system may experience an accommodation conflict, resulting in unstable imaging, harmful eye strain, headaches, and, in the absence of accommodation information, almost a complete lack of surface depth.

Therefore, there is a need for improved technologies to implement 3D displays that resolve these and other problems of the conventional approaches. The systems and techniques described herein are configured to work with the visual configuration of the typical human to address these challenges.

SUMMARY

Embodiments of the present invention are directed to devices, systems and methods for facilitating virtual reality and/or augmented reality interaction for one or more users.

An augmented reality (AR) display system for delivering augmented reality content to a user, according to some embodiments, comprises an image-generating source to provide one or more frames of image data, a light modulator to transmit light associated with the one or more frames of image data, a diffractive optical element (DOE) to receive the light associated with the one or more frames of image data and direct the light to the user's eyes, the DOE comprising a diffraction structure having a waveguide substrate corresponding to a waveguide refractive index, a surface grating, and an intermediate layer (referred to also herein as an "underlayer") disposed between the waveguide substrate and the surface grating, wherein the underlayer corresponds to an underlayer diffractive index that is different from the waveguide refractive index.

According to some embodiments of the invention, a diffraction structure is employed for a DOE that includes an underlayer that resides between a waveguide substrate and a top grating surface. The top grating surface comprises a first material that corresponds to a first refractive index value, the underlayer comprises a second material that corresponds to a second refractive index value, and the substrate comprises a third material that corresponds to a third refractive index value.

Any combination of same or different materials may be employed to implement each of these portions of structure, e.g., where all three materials are different (and all three correspond to different refractive index values), or where two of the layers share the same material (e.g., where two of the three materials are the same and therefore share a common reflective index value that differs from the refractive index value of the third material). Any suitable set of materials may be used to implement any layer of the improved diffraction structure.

Thus a variety of combinations is available wherein an underlayer of one index is combined with a top grating of another index, along with a substrate of a third index, and wherein adjusting these relative values provides a lot of variation in dependence of diffraction efficiency upon incidence angle. A layered waveguide with different layers of refractive indices is presented. Various combinations and permutations are presented along with related performance data to illustrate functionality. The benefits include increased angle, which provides an increased output angle with the grating and therefore an increased field of view with the eyepiece. Further, the ability to counteract the normal reduction in diffraction efficiency with angle is functionally beneficial.

Additional and other objects, features, and advantages of the invention are described in the detail description, figures and claims.

BRIEF DESCRIPTION OF THE DRAWINGS

FIG. 2 illustrates a conventional stereoscopic 3-D simulation display system.

FIG. 3 illustrates an improved approach to implement a stereoscopic 3-D simulation display system according to some embodiments of the invention.

FIG. 7 illustrates a DOE.

FIGS. 10 and 11 illustrate two waveguides into which a beam is injected.

FIG. 18A-D illustrate modification of underlayer characteristics.

DETAILED DESCRIPTION

Figure 1:
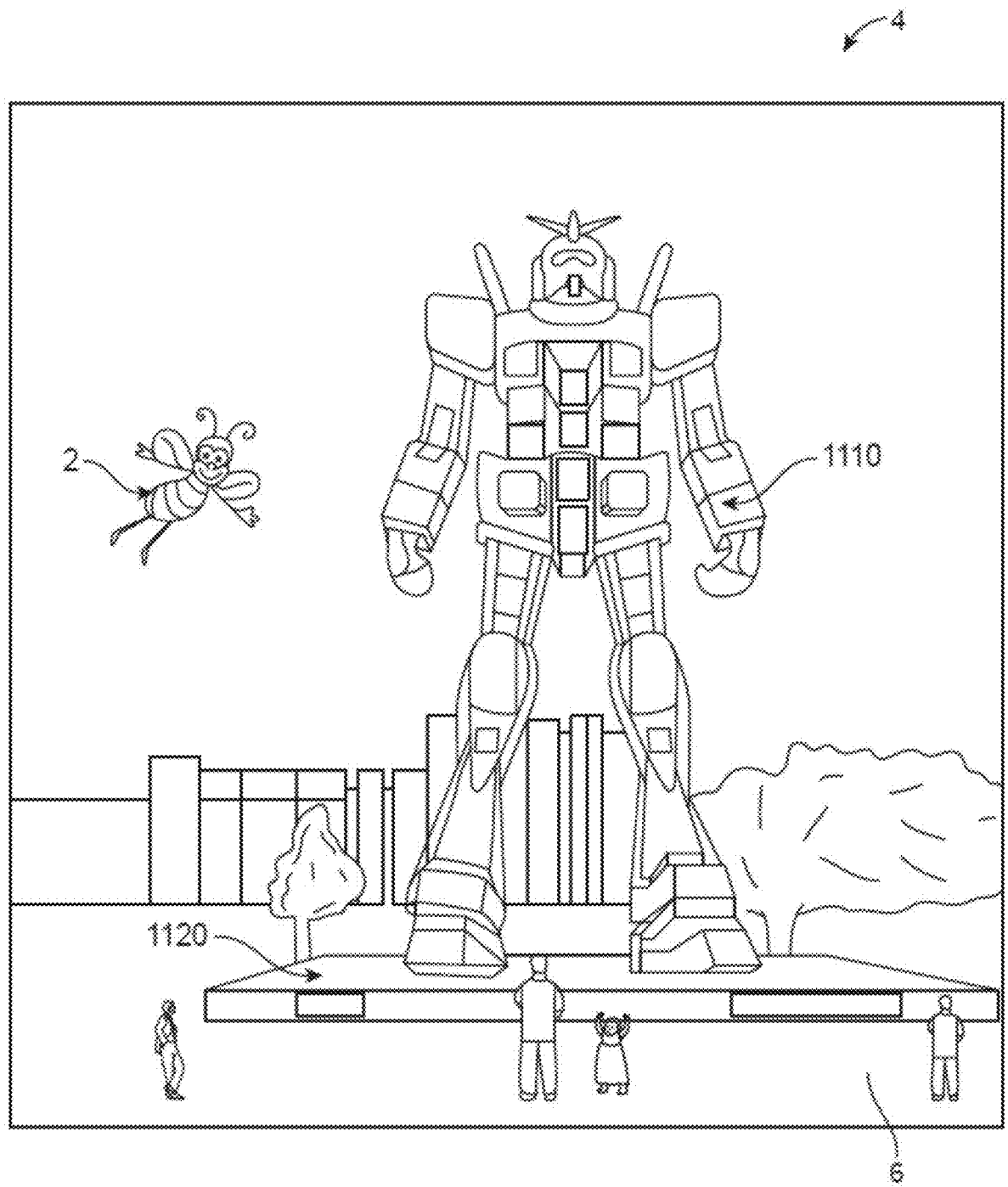
FIG. 1 illustrates a user's view of augmented reality (AR) through a wearable AR user device, in one illustrated embodiment.

According to some embodiments of the invention, a diffraction structure is employed that includes an underlayer/intermediate layer that resides between a waveguide substrate and a top grating surface. The top grating surface comprises a first material that corresponds to a first refractive index value, the underlayer comprises a second material that corresponds to a second refractive index value, and the substrate comprises a third material that corresponds to a third refractive index value.

One advantage of this approach is that appropriate selection of the relative indices of refraction for the three layers allows the structure to obtain a larger field of view for a greater range of incident light, by virtue of the fact that the lowest total internal reflection angle is reduced as the index of refraction is increased. Diffraction efficiencies can be increased, allowing for "brighter" light outputs to the display(s) of image viewing devices.

A variety of combinations is available wherein an underlayer of one index is combined with a top grating of another index, along with a substrate of a third index, and wherein adjusting these relative values provides a lot of variation in dependence of diffraction efficiency upon incidence angle. A layered waveguide with different layers of refractive indices is presented. Various combinations and permutations are presented along with related performance data to illustrate functionality. The benefits include increased angle, which provides an increased output angle with the grating and therefore an increased field of view with the eyepiece. Further, the ability to counteract the normal reduction in diffraction efficiency with angle is functionally beneficial.

Display Systems According to Some Embodiments

This portion of the disclosure describes example display systems that may be used in conjunction with the improved diffraction structure of the invention.

FIG. 2 illustrates a conventional stereoscopic 3-D simulation display system that typically has a separate display 74 and 76 for each eye 4 and 6, respectively, at a fixed radial focal distance 10 from the eye. This conventional approach fails to take into account many of the valuable cues utilized by the human eye and brain to detect and interpret depth in three dimensions, including the accommodation cue.

In fact, the typical human eye is able to interpret numerous layers of depth based upon radial distance, e.g., able to interpret approximately 12 layers of depth. A near field limit of about 0.25 meters is about the closest depth of focus; a far-field limit of about 3 meters means that any item farther than about 3 meters from the human eye receives infinite focus. The layers of focus get more and more thin as one gets closer to the eye; in other words, the eye is able to perceive differences in focal distance that are quite small relatively close to the eye, and this effect dissipates as objects fall farther away from the eye. At an infinite object location, a depth of focus/dioptric spacing value is about 1/3 diopters.

FIG. 3 illustrates an improved approach to implement a stereoscopic 3-D simulation display system according to some embodiments of the invention, where two complex images are displayed, one for each eye 4 and 6, with various radial focal depths (12) for various aspects (14) of each image may be utilized to provide each eye with the perception of three dimensional depth layering within the perceived image. Since there are multiple focal planes (e.g., 12 focal planes) between the eye of the user and infinity, these focal planes, and the data within the depicted relationships, may be utilized to position virtual elements within an augmented reality scenario for a user's viewing, because the human eye is constantly sweeping around to utilize the focal planes to perceive depth. While this figure shows a specific number of focal planes at various depths, it is noted that an implementation of the invention may use any number of focal planes as necessary for the specific application desired, and the invention is therefore not limited to devices having only to the specific number of focal planes shown in any of the figures in the present disclosure.

Referring to FIGS. 4A-4D, some general componentry options are illustrated according to some embodiments of the invention. In the portions of the detailed description which follow the discussion of FIGS. 4A-4D, various systems, subsystems, and components are presented for addressing the objectives of providing a high-quality, comfortably-perceived display system for human VR and/or AR.

Figure 4A:
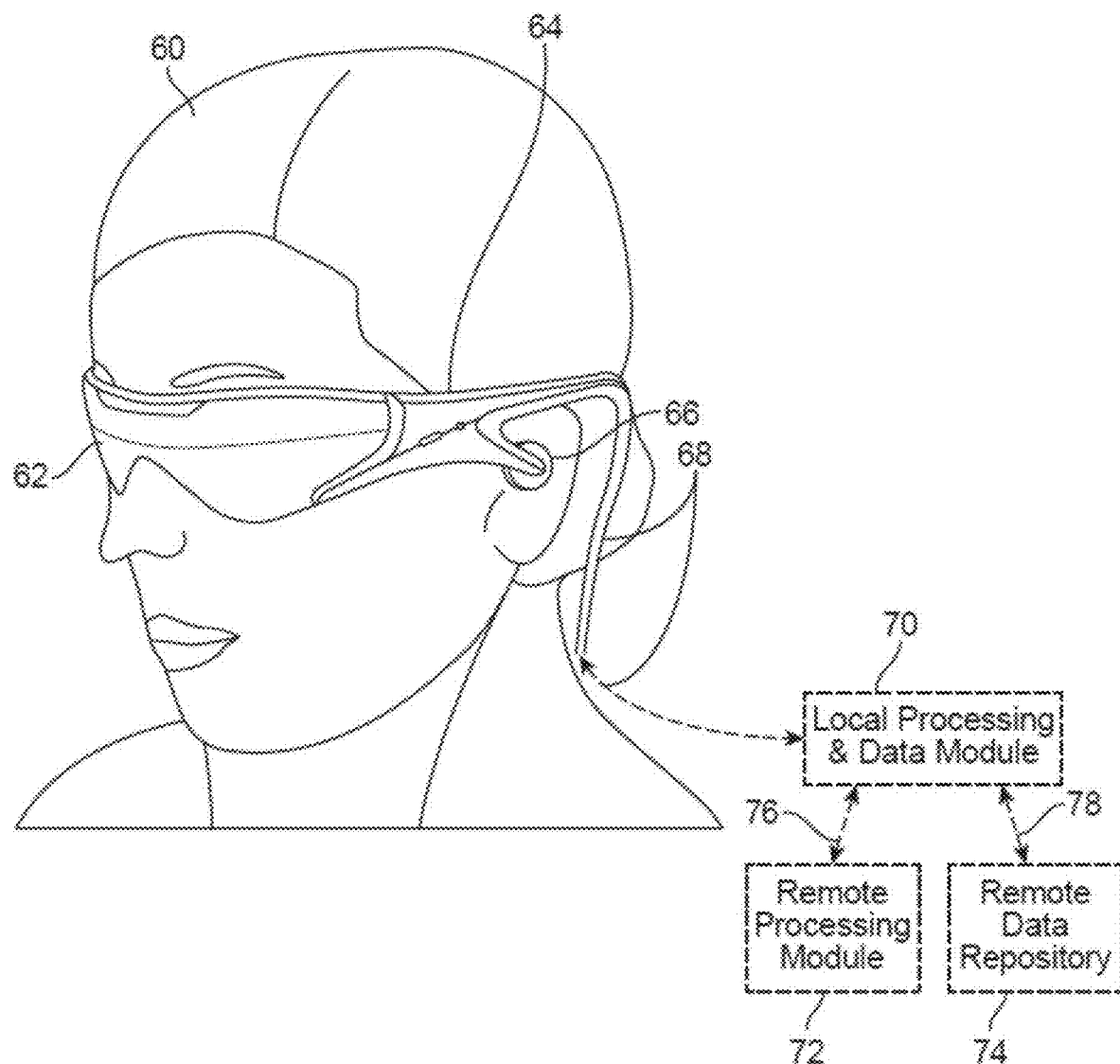
FIGS. 4A-4D illustrates various systems, subsystems, and components for addressing the objectives of providing a high-quality, comfortably-perceived display system for human VR and/or AR.
Figure 4B:
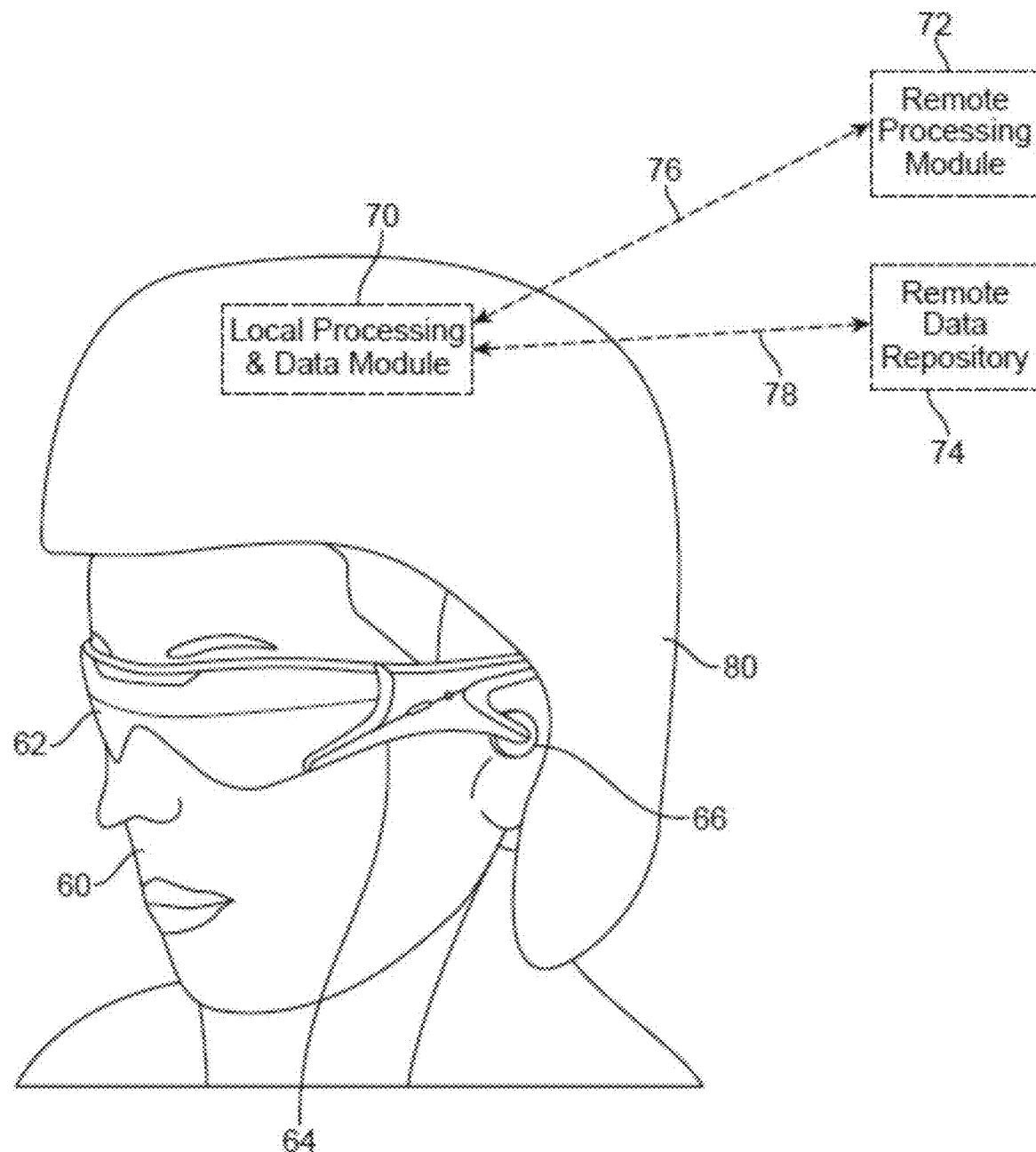
Figure 4C:
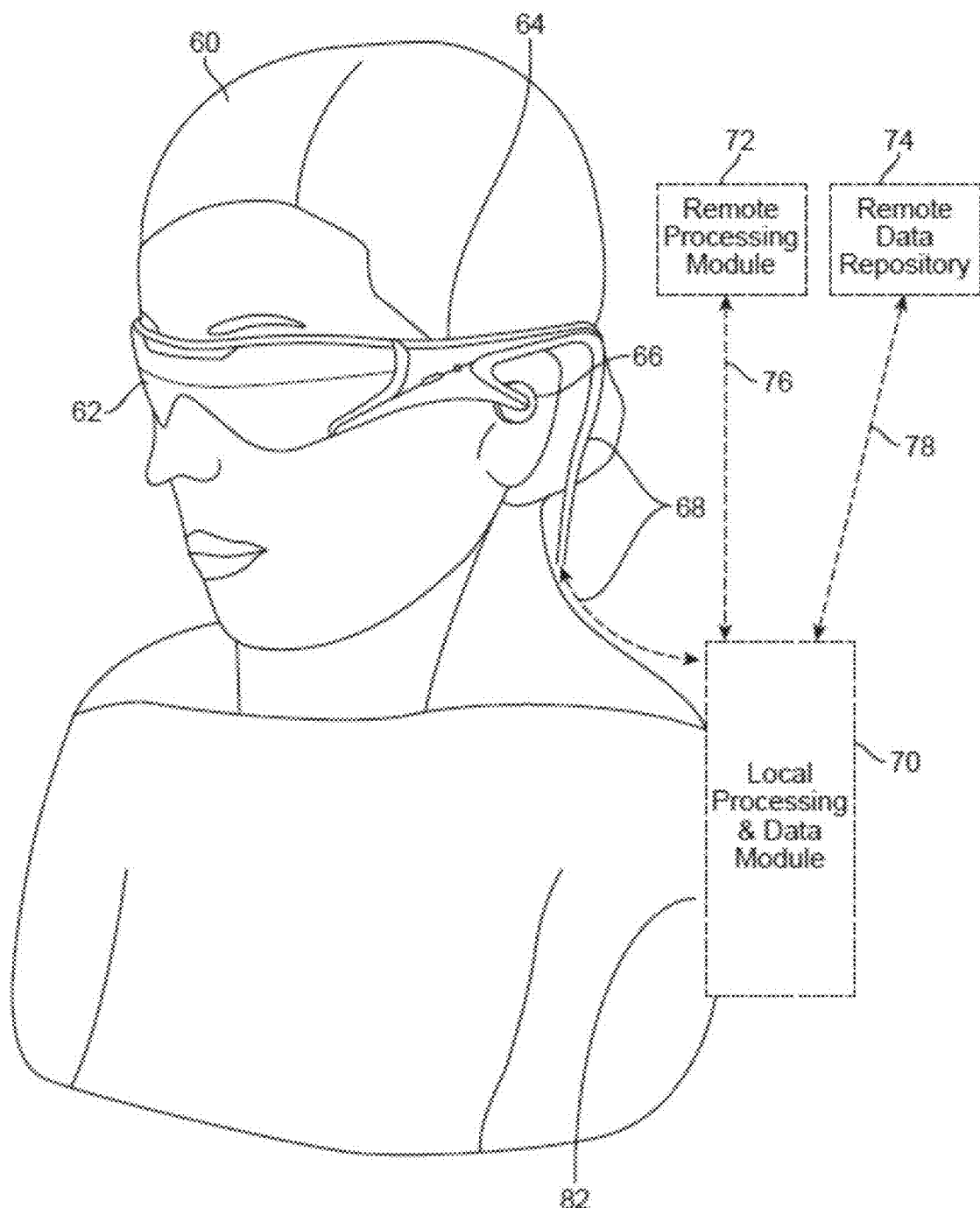
Figure 4D:
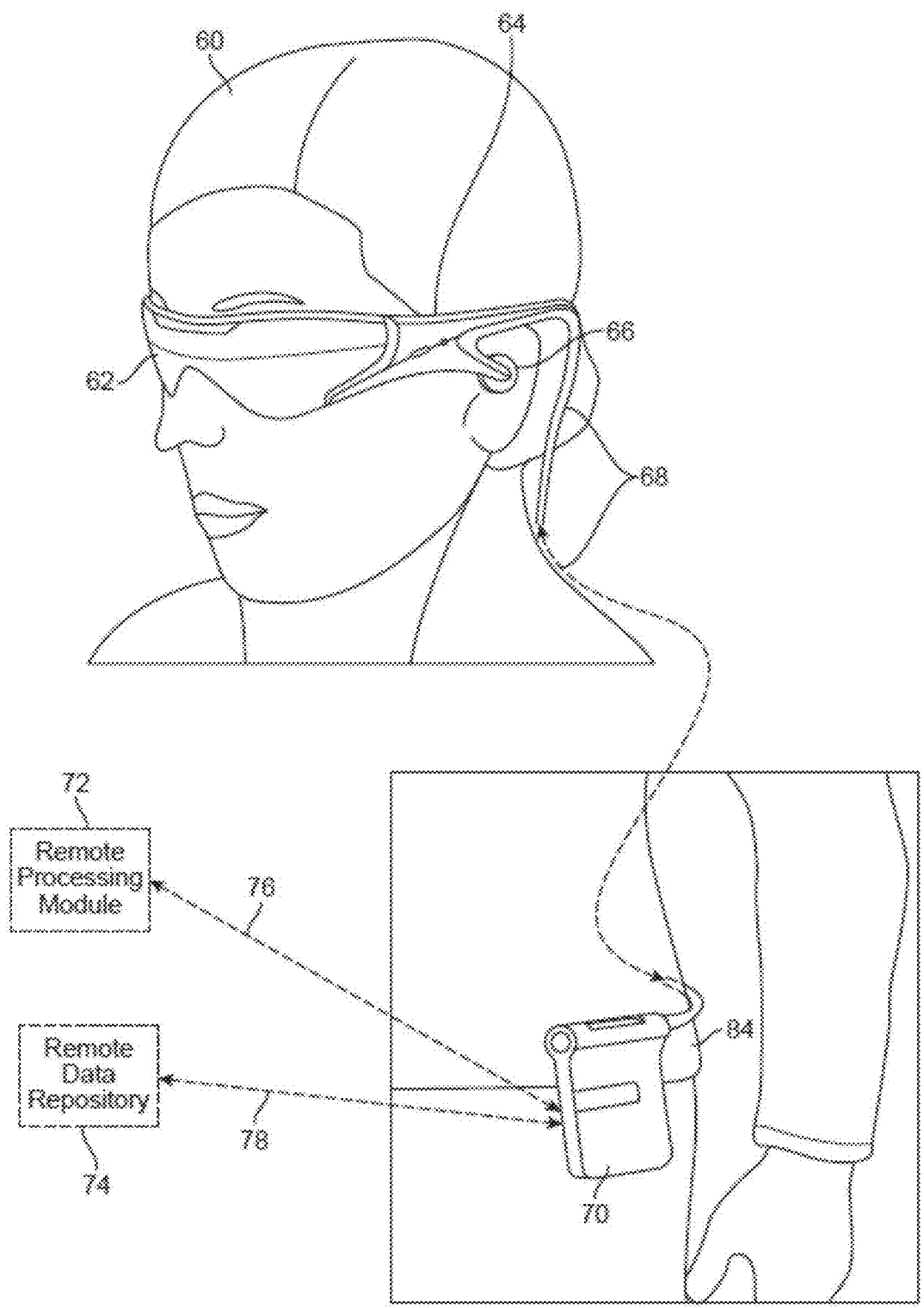

As shown in FIG. 4A, an AR system user (60) is depicted wearing a frame (64) structure coupled to a display system (62) positioned in front of the eyes of the user. A speaker (66) is coupled to the frame (64) in the depicted configuration and positioned adjacent the ear canal of the user (in one embodiment, another speaker, not shown, is positioned adjacent the other ear canal of the user to provide for stereo/shapeable sound control). The display (62) is operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 4B, embedded in headphones, removably attached to the torso (82) of the user (60) in a backpack-style configuration as shown in the embodiment of FIG. 4C, or removably attached to the hip (84) of the user (60) in a belt-coupling style configuration as shown in the embodiment of FIG. 4D.

The local processing and data module (70) may comprise a power-efficient processor or controller, as well as digital memory, such as flash memory, both of which may be utilized to assist in the processing, caching, and storage of data a) captured from sensors which may be operatively coupled to the frame (64), such as image capture devices (such as cameras), microphones, inertial measurement units, accelerometers, compasses, GPS units, radio devices, and/or gyros; and/or b) acquired and/or processed using the remote processing module (72) and/or remote data repository (74), possibly for passage to the display (62) after such processing or retrieval. The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may comprise one or more relatively powerful processors or controllers configured to analyze and process data and/or image information. In one embodiment, the remote data repository (74) may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Perceptions of Z-axis difference (i.e., distance straight out from the eye along the optical axis) may be facilitated by using a waveguide in conjunction with a variable focus optical element configuration. Image information from a display may be collimated and injected into a waveguide and distributed in a large exit pupil manner using any suitable substrate-guided optics methods known to those skilled in the art—and then variable focus optical element capability may be utilized to change the focus of the wavefront of light emerging from the waveguide and provide the eye with the perception that the light coming from the waveguide is from a particular focal distance. In other words, since the incoming light has been collimated to avoid challenges in total internal reflection waveguide configurations, it will exit in collimated fashion, requiring a viewer's eye to accommodate to the far point to bring it into focus on the retina, and naturally be interpreted as being from optical infinity—unless some other intervention causes the light to be refocused and perceived as from a different viewing distance; one suitable such intervention is a variable focus lens.

In some embodiments, collimated image information is injected into a piece of glass or other material at an angle such that it totally internally reflects and is passed into the adjacent waveguide. The waveguide may be configured so that the collimated light from the display is distributed to exit somewhat uniformly across the distribution of reflectors or diffractive features along the length of the waveguide. Upon exit toward the eye, the exiting light is passed through a variable focus lens element wherein, depending upon the controlled focus of the variable focus lens element, the light exiting the variable focus lens element and entering the eye will have various levels of focus (a collimated flat wavefront to represent optical infinity, more and more beam divergence/wavefront curvature to represent closer viewing distance relative to the eye 58).

In a "frame sequential" configuration, a stack of sequential two-dimensional images may be fed to the display sequentially to produce three-dimensional perception over time, in a manner akin to the manner in which a computed tomography system uses stacked image slices to represent a three-dimensional structure. A series of two-dimensional image slices may be presented to the eye, each at a different focal distance to the eye, and the eye/brain would integrate such a stack into a perception of a coherent three-dimensional volume. Depending upon the display type, line-by-line, or even pixel-by-pixel sequencing may be conducted to produce the perception of three-dimensional viewing. For example, with a scanned light display (such as a scanning fiber display or scanning mirror display), then the display is presenting the waveguide with one line or one pixel at a time in a sequential fashion.

Figure 6:
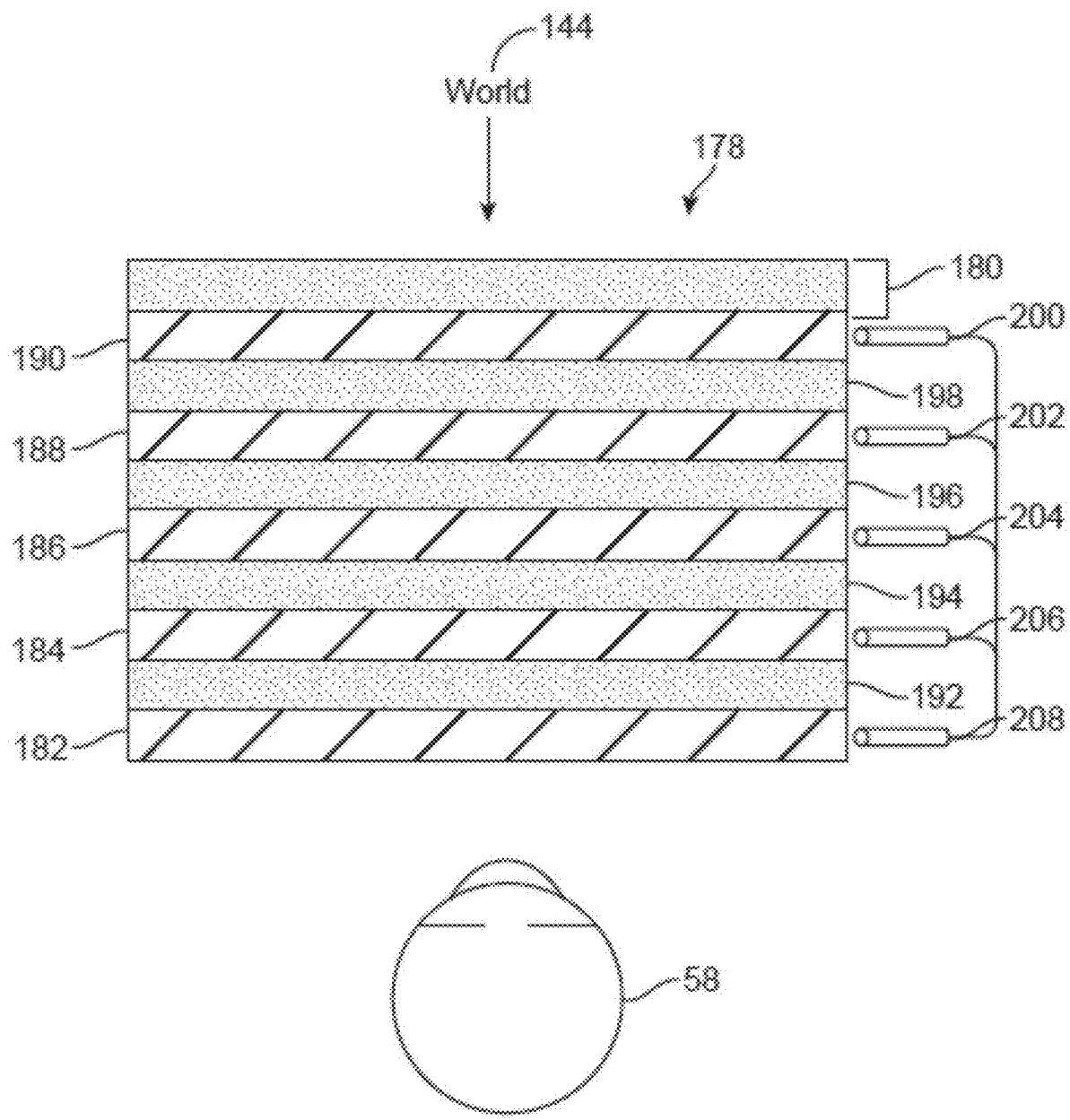
FIG. 6 illustrates a stacked waveguide assembly.

Referring to FIG. 6, a stacked waveguide assembly (178) may be utilized to provide three-dimensional perception to the eye/brain by having a plurality of waveguides (182, 184, 186, 188, 190) and a plurality of weak lenses (198, 196, 194, 192) configured together to send image information to the eye with various levels of wavefront curvature for each waveguide level indicative of focal distance to be perceived for that waveguide level. A plurality of displays (200, 202, 204, 206, 208), or in another embodiment a single multiplexed display, may be utilized to inject collimated image information into the waveguides (182, 184, 186, 188, 190), each of which may be configured, as described above, to distribute incoming light substantially equally across the length of each waveguide, for exit down toward the eye.

The waveguide (182) nearest the eye is configured to deliver collimated light, as injected into such waveguide (182), to the eye, which may be representative of the optical infinity focal plane. The next waveguide up (184) is configured to send out collimated light which passes through the first weak lens (192; e.g., a weak negative lens) before it can reach the eye (58). The first weak lens (192) may be configured to create a slight convex wavefront curvature so that the eye/brain interprets light coming from that next waveguide up (184) as coming from a first focal plane closer inward toward the person from optical infinity. Similarly, the third up waveguide (186) passes its output light through both the first (192) and second (194) lenses before reaching the eye (58). The combined optical power of the first (192) and second (194) lenses may be configured to create another incremental amount of wavefront divergence so that the eye/brain interprets light coming from that third waveguide up (186) as coming from a second focal plane even closer inward toward the person from optical infinity than was light from the next waveguide up (184).

The other waveguide layers (188, 190) and weak lenses (196, 198) are similarly configured, with the highest waveguide (190) in the stack sending its output through all of the weak lenses between it and the eye for an aggregate focal power representative of the closest focal plane to the person. To compensate for the stack of lenses (198, 196, 194, 192) when viewing/interpreting light coming from the world (144) on the other side of the stacked waveguide assembly (178), a compensating lens layer (180) is disposed at the top of the stack to compensate for the aggregate power of the lens stack (198, 196, 194, 192) below. Such a configuration provides as many perceived focal planes as there are available waveguide/lens pairings, again with a relatively large exit pupil configuration as described above. Both the reflective aspects of the waveguides and the focusing aspects of the lenses may be static (i.e., not dynamic or electro-active). In an alternative embodiment they may be dynamic using electro-active features as described above, enabling a small number of waveguides to be multiplexed in a time sequential fashion to produce a larger number of effective focal planes.

Various diffraction configurations can be employed for focusing and/or redirecting collimated beams. For example, passing a collimated beam through a linear diffraction pattern, such as a Bragg grating, will deflect, or "steer", the beam. Passing a collimated beam through a radially symmetric diffraction pattern, or "Fresnel zone plate", will change the focal point of the beam. A combination diffraction pattern can be employed that has both linear and radial elements produces both deflection and focusing of a collimated input beam. These deflection and focusing effects can be produced in a reflective as well as transmissive mode.

Figure 8:
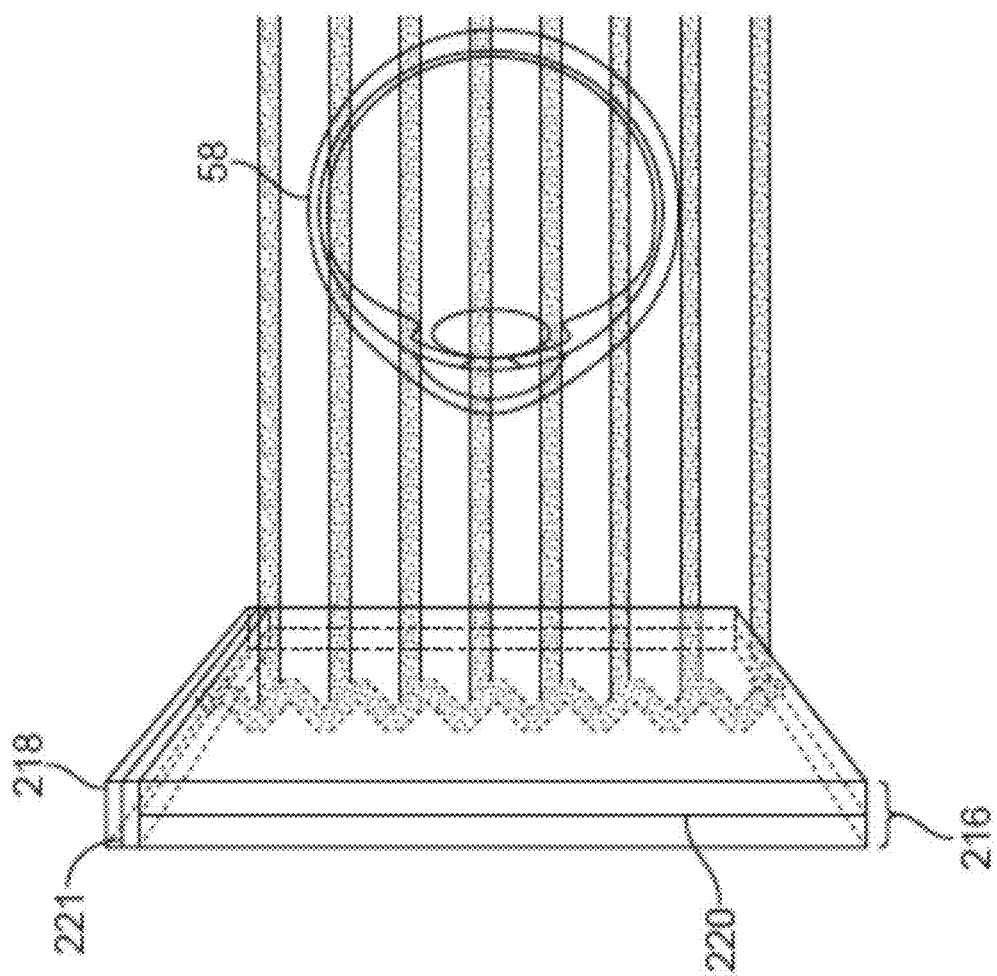
FIGS. 8 and 9 illustrate example diffraction patterns.

These principles may be applied with waveguide configurations to allow for additional optical system control. As shown in FIG. 7, a diffraction pattern (220), or "diffractive optical element" (or "DOE") has been embedded within a planar waveguide (216) such that as a collimated beam is totally internally reflected along the planar waveguide (216), it intersects the diffraction pattern (220) at a multiplicity of locations. The structure may also include another waveguide (218) into which the beam may be injected (by a projector or display, for example), with a DOE (221) embedded in this other waveguide (218), Preferably, the DOE (220) has a relatively low diffraction efficiency so that only a portion of the light of the beam is deflected toward the eye (58) with each intersection of the DOE (220) while the rest continues to move through the planar waveguide (216) via total internal reflection; the light carrying the image information is thus divided into a number of related light beams that exit the waveguide at a multiplicity of locations and the result is a fairly uniform pattern of exit emission toward the eye (58) for this particular collimated beam bouncing around within the planar waveguide (216), as shown in FIG. 8. The exit beams toward the eye (58) are shown in FIG. 8 as substantially parallel, because, in this case, the DOE (220) has only a linear diffraction pattern. However, changes to this linear diffraction pattern pitch may be utilized to controllably deflect the exiting parallel beams, thereby producing a scanning or tiling functionality.

Figure 9:
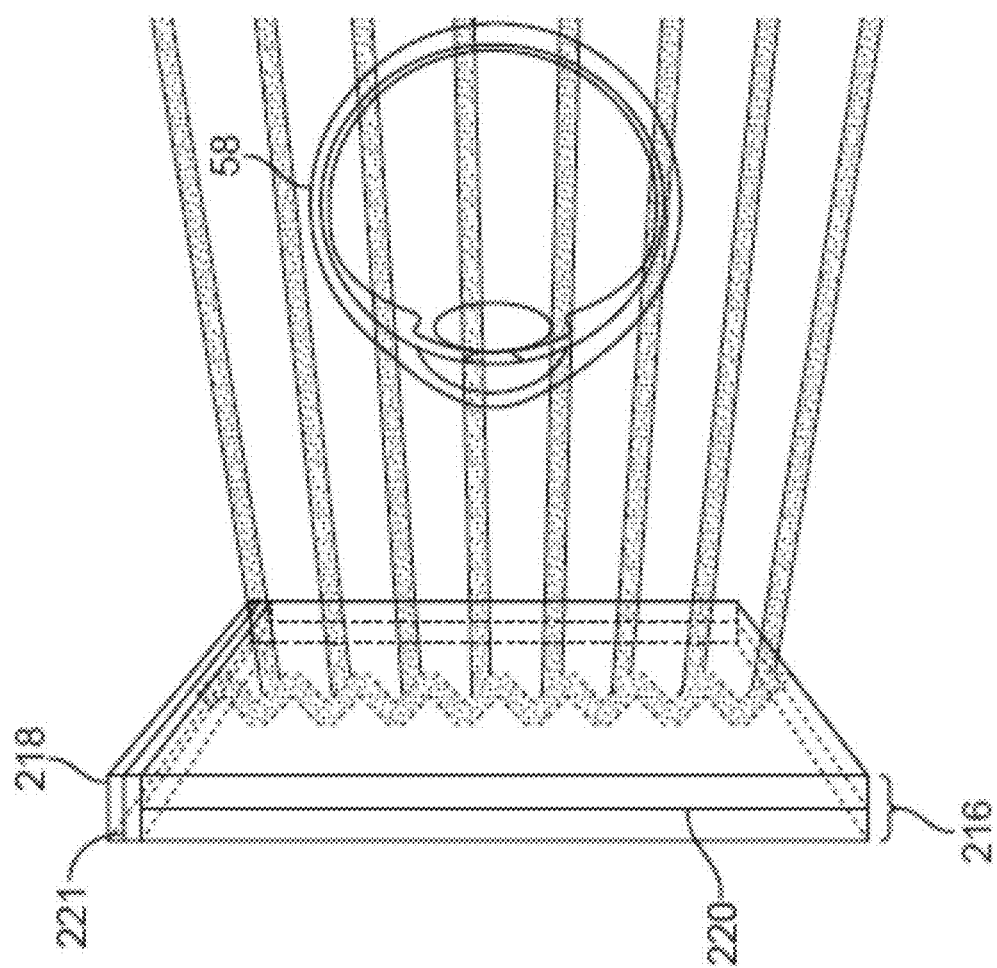

Referring to FIG. 9, with changes in the radially symmetric diffraction pattern component of the embedded DOE (220), the exit beam pattern is more divergent, which would require the eye to accommodation to a closer distance to bring it into focus on the retina and would be interpreted by the brain as light from a viewing distance closer to the eye than optical infinity.

Referring to FIG. 10, with the addition of the other waveguide (218) into which the beam may be injected (by a projector or display, for example), a DOE (221) embedded in this other waveguide (218), such as a linear diffraction pattern, may function to spread the light across the entire larger planar waveguide (216), which functions to provide the eye (58) with a very large incoming field of incoming light that exits from the larger planar waveguide (216), e.g., a large eye box, in accordance with the particular DOE configurations at work.

Figure 11:
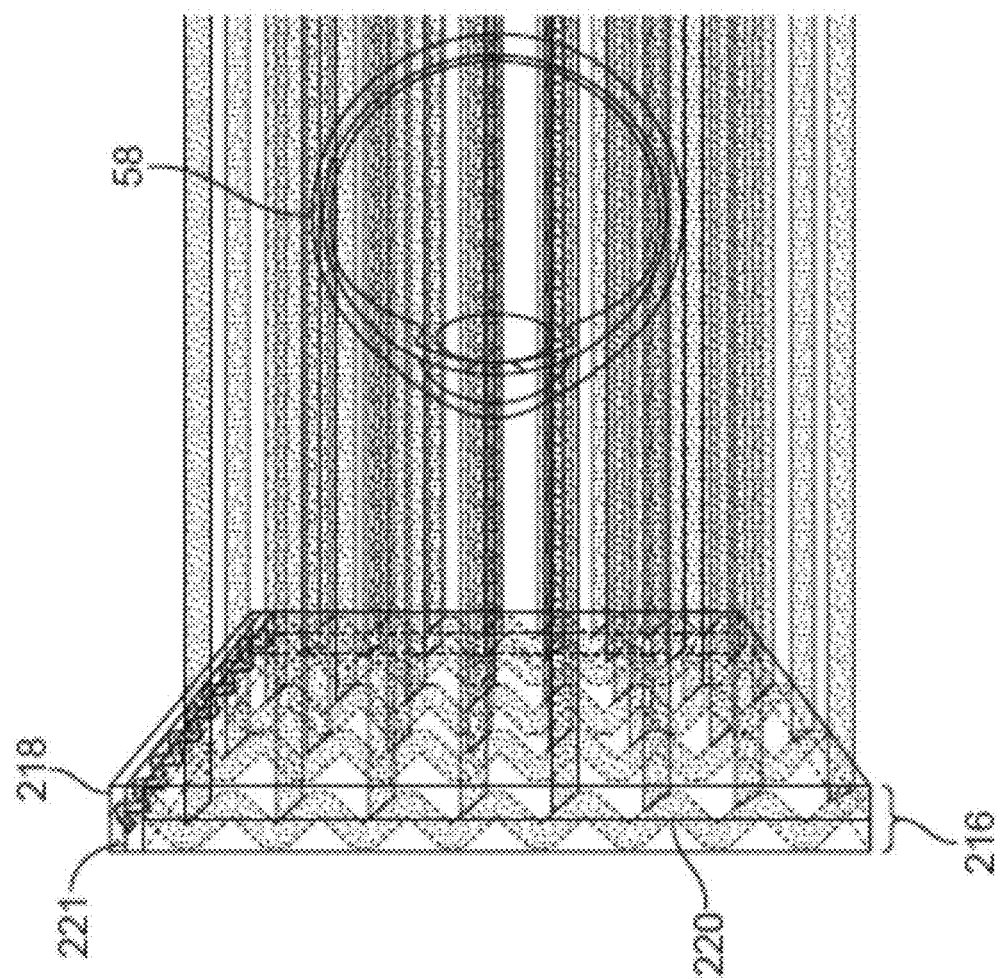

The DOEs (220, 221) are depicted bisecting the associated waveguides (216, 218) but this need not be the case; they could be placed closer to, or upon, either side of either of the waveguides (216, 218) to have the same functionality. Thus, as shown in FIG. 11, with the injection of a single collimated beam, an entire field of cloned collimated beams may be directed toward the eye (58). In addition, with a combined linear diffraction pattern/radially symmetric diffraction pattern scenario such as that discussed above, a beam distribution waveguide optic (for functionality such as exit pupil functional expansion; with a configuration such as that of FIG. 11, the exit pupil can be as large as the optical element itself, which can be a very significant advantage for user comfort and ergonomics) with Z-axis focusing capability is presented, in which both the divergence angle of the cloned beams and the wavefront curvature of each beam represent light coming from a point closer than optical infinity.

In one embodiment, one or more DOEs are switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light). Further, with dynamic changes to the diffraction terms, a beam scanning or tiling functionality may be achieved. As noted above, it is desirable to have a relatively low diffraction grating efficiency in each of the DOEs (220, 221) because it facilitates distribution of the light, and also because light coming through the waveguides that is desirably transmitted (for example, light coming from the world 144 toward the eye 58 in an augmented reality configuration) is less affected when the diffraction efficiency of the DOE that it crosses (220) is lower—so a better view of the real world through such a configuration is achieved.

Configurations such as those illustrated herein preferably are driven with injection of image information in a time sequential approach, with frame sequential driving being the most straightforward to implement. For example, an image of the sky at optical infinity may be injected at time1 and the diffraction grating retaining collimation of light may be utilized. Thereafter, an image of a closer tree branch may be injected at time2 while a DOE controllably imparts a focal change, say one diopter or 1 meter away, to provide the eye/brain with the perception that the branch light information is coming from the closer focal range. This kind of paradigm can be repeated in rapid time sequential fashion such that the eye/brain perceives the input to be all part of the same image. This is just a two focal plane example—preferably the system will include more focal planes to provide a smoother transition between objects and their focal distances. This kind of configuration generally assumes that the DOE is switched at a relatively low speed (i.e., in sync with the frame-rate of the display that is injecting the images—in the range of tens to hundreds of cycles/second).

The opposite extreme may be a configuration wherein DOE elements can shift focus at tens to hundreds of MHz or greater, which facilitates switching of the focus state of the DOE elements on a pixel-by-pixel basis as the pixels are scanned into the eye (58) using a scanned light display type of approach. This is desirable because it means that the overall display frame-rate can be kept quite low; just low enough to make sure that "flicker" is not a problem (in the range of about 60-120 frames/sec).

In between these ranges, if the DOEs can be switched at KHz rates, then on a line-by-line basis the focus on each scan line may be adjusted, which may afford the user with a visible benefit in terms of temporal artifacts during an eye motion relative to the display, for example. For instance, the different focal planes in a scene may, in this manner, be interleaved, to minimize visible artifacts in response to a head motion (as is discussed in greater detail later in this disclosure). A line-by-line focus modulator may be operatively coupled to a line scan display, such as a grating light valve display, in which a linear array of pixels is swept to form an image; and may be operatively coupled to scanned light displays, such as fiber-scanned displays and mirror-scanned light displays.

A stacked configuration, similar to those of FIG. 6, may use dynamic DOEs to provide multi-planar focusing simultaneously. For example, with three simultaneous focal planes, a primary focus plane (based upon measured eye accommodation, for example) could be presented to the user, and a + margin and − margin (i.e., one focal plane closer, one farther out) could be utilized to provide a large focal range in which the user can accommodate before the planes need be updated. This increased focal range can provide a temporal advantage if the user switches to a closer or farther focus (i.e., as determined by accommodation measurement); then the new plane of focus could be made to be the middle depth of focus, with the + and − margins again ready for a fast switchover to either one while the system catches up.

Figure 12:
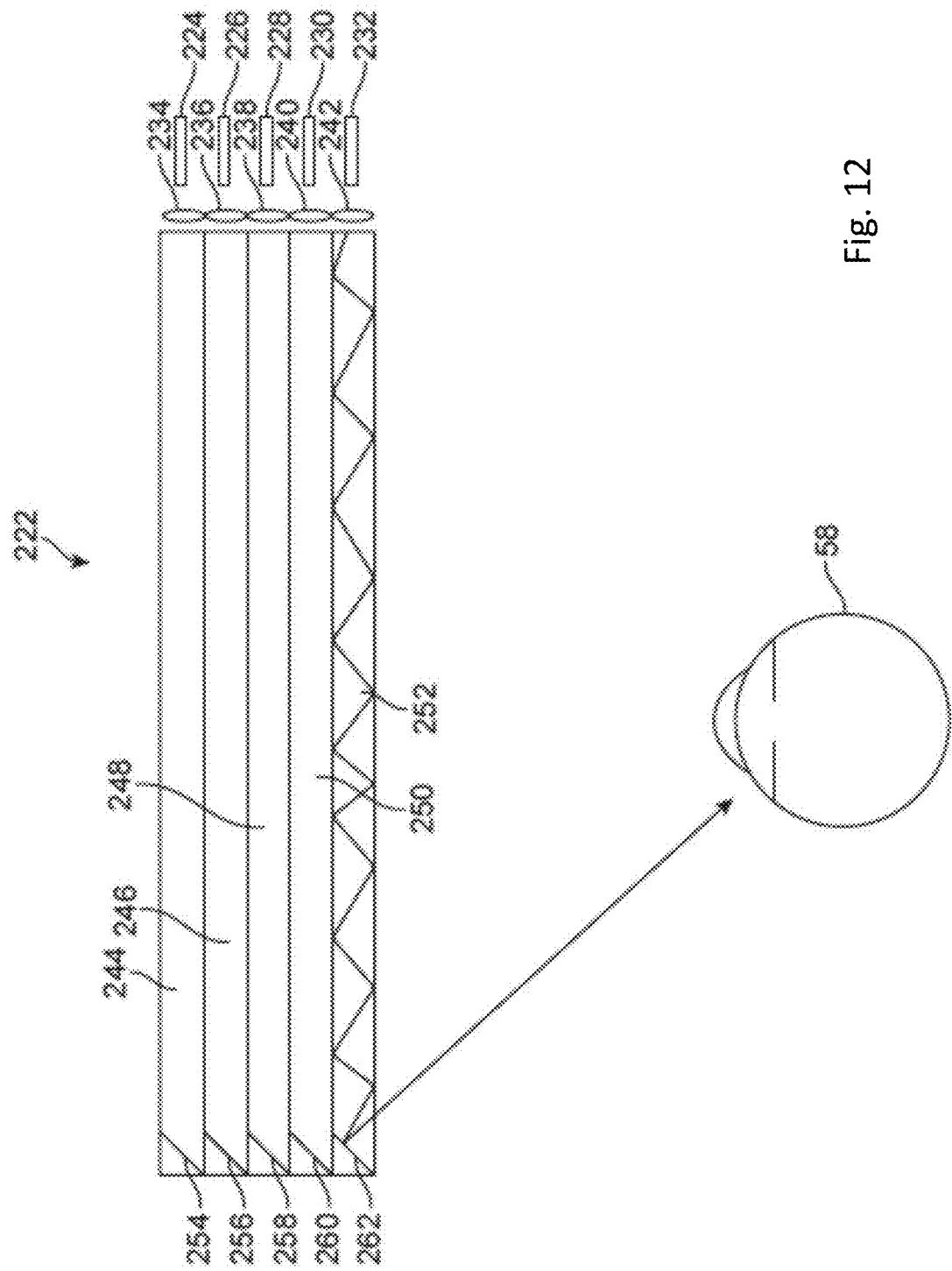
FIG. 12 illustrates a stack of waveguides.

Referring to FIG. 12, a stack (222) of planar waveguides (244, 246, 248, 250, 252) is shown, each having a reflector (254, 256, 258, 260, 262) at the end and being configured such that collimated image information injected in one end by a display (224, 226, 228, 230, 232) bounces by total internal reflection down to the reflector, at which point some or all of the light is reflected out toward an eye or other target. Each of the reflectors may have slightly different angles so that they all reflect exiting light toward a common destination such as a pupil. Lenses (234, 236, 238, 240, 242) may be interposed between the displays and waveguides for beam steering and/or focusing.

As discussed above, an object at optical infinity creates a substantially planar wavefront, while an object closer, such as 1 m away from the eye, creates a curved wavefront (with about 1 m convex radius of curvature). The eye's optical system needs to have enough optical power to bend the incoming rays of light so that they end up focused on the retina (convex wavefront gets turned into concave, and then down to a focal point on the retina). These are basic functions of the eye.

In many of the embodiments described above, light directed to the eye has been treated as being part of one continuous wavefront, some subset of which would hit the pupil of the particular eye. In another approach, light directed to the eye may be effectively discretized or broken down into a plurality of beamlets or individual rays, each of which has a diameter less than about 0.5 mm and a unique propagation pathway as part of a greater aggregated wavefront that may be functionally created with the an aggregation of the beamlets or rays. For example, a curved wavefront may be approximated by aggregating a plurality of discrete neighboring collimated beams, each of which is approaching the eye from an appropriate angle to represent a point of origin that matches the center of the radius of curvature of the desired aggregate wavefront.

When the beamlets have a diameter of about 0.5 mm or less, it is as though it is coming through a pinhole lens configuration, which means that each individual beamlet is always in relative focus on the retina, independent of the accommodation state of the eye—however the trajectory of each beamlet will be affected by the accommodation state. For instance, if the beamlets approach the eye in parallel, representing a discretized collimated aggregate wavefront, then an eye that is correctly accommodated to infinity will deflect the beamlets to all converge upon the same shared spot on the retina, and will appear in focus. If the eye accommodates to, say, 1 m, the beams will be converged to a spot in front of the retina, cross paths, and fall on multiple neighboring or partially overlapping spots on the retina—appearing blurred.

If the beamlets approach the eye in a diverging configuration, with a shared point of origin 1 meter from the viewer, then an accommodation of 1 m will steer the beams to a single spot on the retina, and will appear in focus; if the viewer accommodates to infinity, the beamlets will converge to a spot behind the retina, and produce multiple neighboring or partially overlapping spots on the retina, producing a blurred image. Stated more generally, the accommodation of the eye determines the degree of overlap of the spots on the retina, and a given pixel is "in focus" when all of the spots are directed to the same spot on the retina and "defocused" when the spots are offset from one another. This notion that all of the 0.5 mm diameter or less beamlets are always in focus, and that they may be aggregated to be perceived by the eyes/brain as though they are substantially the same as coherent wavefronts, may be utilized in producing configurations for comfortable three-dimensional virtual or augmented reality perception.

In other words, a set of multiple narrow beams may be used to emulate what is going on with a larger diameter variable focus beam, and if the beamlet diameters are kept to a maximum of about 0.5 mm, then they maintain a relatively static focus level, and to produce the perception of out-of-focus when desired, the beamlet angular trajectories may be selected to create an effect much like a larger out-of-focus beam (such a defocusing treatment may not be the same as a Gaussian blur treatment as for the larger beam, but will create a multimodal point spread function that may be interpreted in a similar fashion to a Gaussian blur).

In some embodiments, the beamlets are not mechanically deflected to form this aggregate focus effect, but rather the eye receives a superset of many beamlets that includes both a multiplicity of incident angles and a multiplicity of locations at which the beamlets intersect the pupil; to represent a given pixel from a particular viewing distance, a subset of beamlets from the superset that comprise the appropriate angles of incidence and points of intersection with the pupil (as if they were being emitted from the same shared point of origin in space) are turned on with matching color and intensity, to represent that aggregate wavefront, while beamlets in the superset that are inconsistent with the shared point of origin are not turned on with that color and intensity (but some of them may be turned on with some other color and intensity level to represent, e.g., a different pixel).

Figure 5:
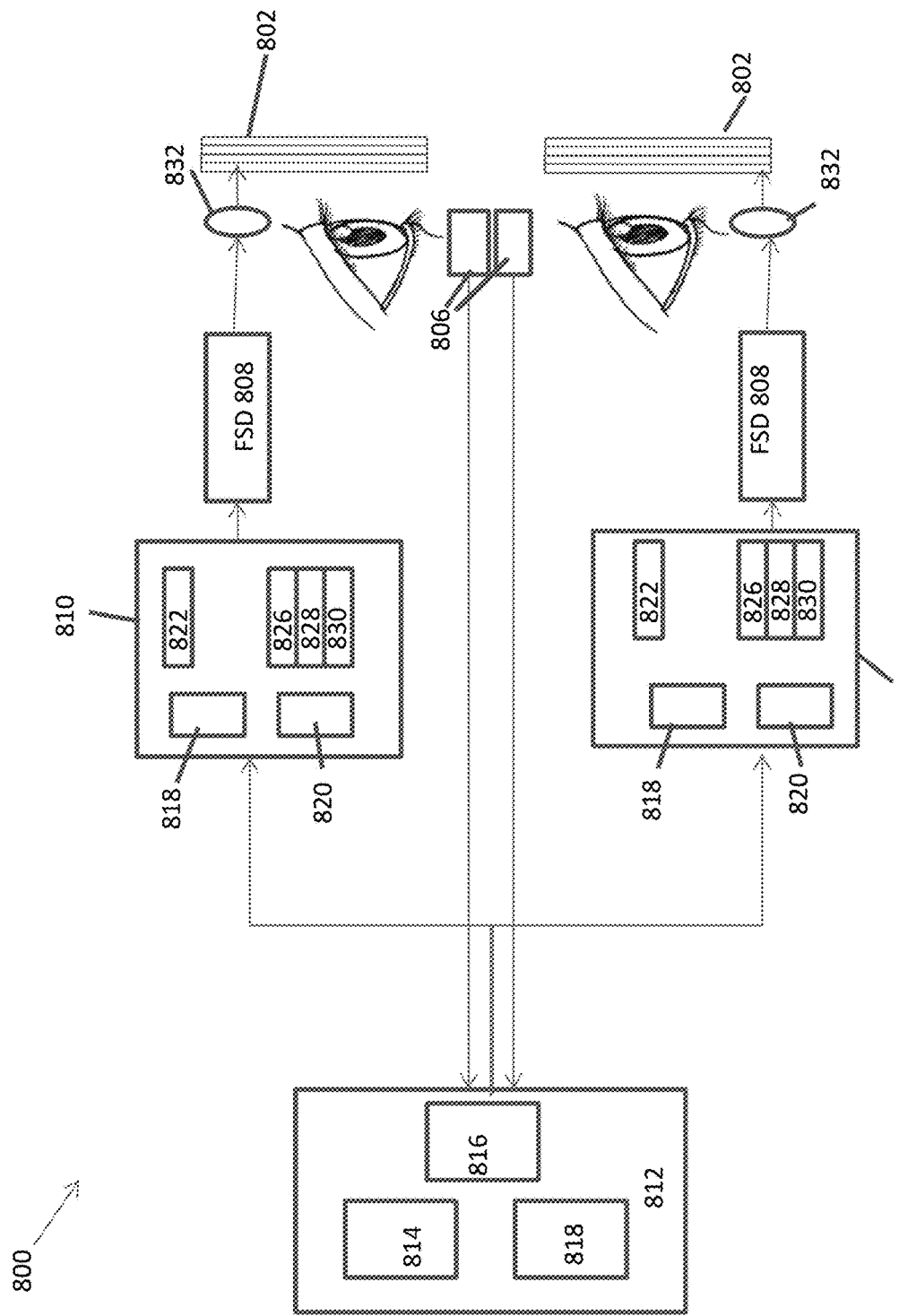
FIG. 5 illustrates a plan view of an example configuration of a system utilizing the improved diffraction structure.

Referring now to FIG. 5, an example embodiment 800 of the AR system that uses an improved diffraction structure will now be described. The AR system generally includes an image generating processor 812, at least one FSD 808 (fiber scanning device), FSD circuitry 810, a coupling optic 832, and at least one optics assembly (DOE assembly 802) having stacked waveguides with the improved diffraction structure described below. The system may also include an eye-tracking subsystem 806. As shown in FIG. 5, the FSD circuitry may comprise circuitry 810 that is in communication with the image generation processor 812 having a maxim chip CPU 818, a temperature sensor 820, a piezo-electrical drive/transducer 822, a red laser 826, a blue laser 828, and a green laser 830 and a fiber combiner that combines all three lasers 826, 828 and 830. It is noted that other types of imaging technologies are also usable instead of FSD devices. For example, high-resolution liquid crystal display ("LCD") systems, a backlighted ferroelectric panel display, and/or a higher-frequency DLP system may all be used in some embodiments of the invention.

The image generating processor is responsible for generating virtual content to be ultimately displayed to the user. The image generating processor may convert an image or video associated with the virtual content to a format that can be projected to the user in 3D. For example, in generating 3D content, the virtual content may need to be formatted such that portions of a particular image are displayed on a particular depth plane while other are displayed at other depth planes. Or, all of the image may be generated at a particular depth plane. Or, the image generating processor may be programmed to feed slightly different images to right and left eye such that when viewed together, the virtual content appears coherent and comfortable to the user's eyes. In one or more embodiments, the image generating processor 812 delivers virtual content to the optics assembly in a time-sequential manner. A first portion of a virtual scene may be delivered first, such that the optics assembly projects the first portion at a first depth plane. Then, the image generating processor 812 may deliver another portion of the same virtual scene such that the optics assembly projects the second portion at a second depth plane and so on. Here, the Alvarez lens assembly may be laterally translated quickly enough to produce multiple lateral translations (corresponding to multiple depth planes) on a frame-to frame basis.

The image generating processor 812 may further include a memory 814, a CPU 818, a GPU 816, and other circuitry for image generation and processing. The image generating processor may be programmed with the desired virtual content to be presented to the user of the AR system. It should be appreciated that in some embodiments, the image generating processor may be housed in the wearable AR system. In other embodiments, the image generating processor and other circuitry may be housed in a belt pack that is coupled to the wearable optics.

The AR system also includes coupling optics 832 to direct the light from the FSD to the optics assembly 802. The coupling optics 832 may refer to one more conventional lenses that are used to direct the light into the DOE assembly. The AR system also includes the eye-tracking subsystem 806 that is configured to track the user's eyes and determine the user's focus.

In one or more embodiments, software blurring may be used to induce blurring as part of a virtual scene. A blurring module may be part of the processing circuitry in one or more embodiments. The blurring module may blur portions of one or more frames of image data being fed into the DOE. In such an embodiment, the blurring module may blur out parts of the frame that are not meant to be rendered at a particular depth frame.

Example approaches that can be used to implement the above image display systems, and components therein, are described in U.S. Utility patent application Ser. No. 14/555,585 filed on Nov. 27, 2014, which is incorporated by reference herein in its entirety.

Improved Diffraction Structure

As stated above, a diffraction pattern can be formed onto a planar waveguide, such that as a collimated beam is totally internally reflected along the planar waveguide, the beam intersects the diffraction pattern at a multiplicity of locations. This arrangement can be stacked to provide image objects at multiple focal planes within a stereoscopic 3-D simulation display system according to some embodiments of the invention.

Figure 13A:
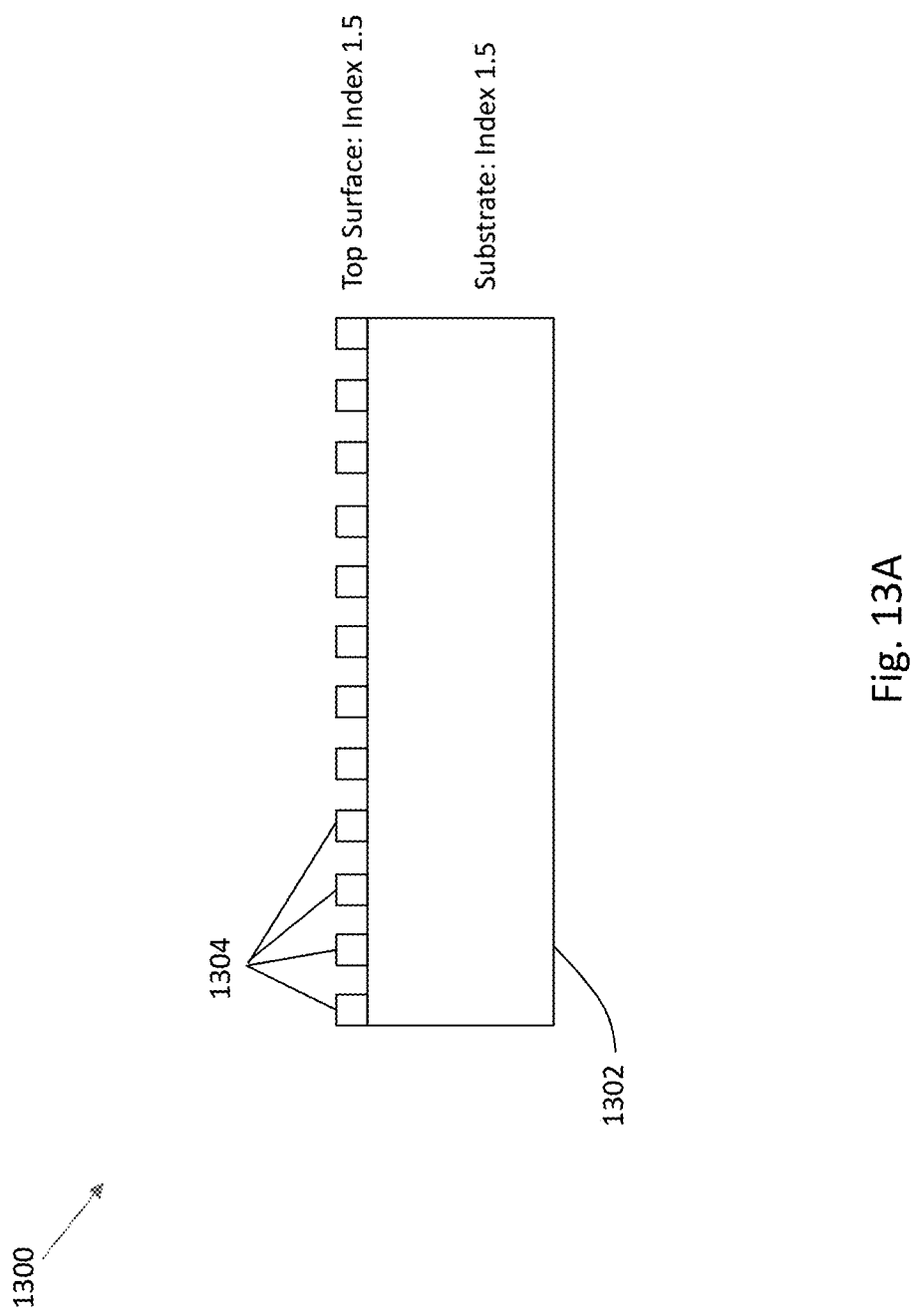
FIG. 13A illustrates an example approach to implement a diffraction structure having a waveguide substrate and a top grating surface, but without an underlayer.

FIG. 13A illustrates one possible approach that can be taken to implement a structure 1300 of a waveguide 1302 (also referred to herein as a "light guide", "substrate", or "waveguide substrate"), where outcoupling gratings 1304 are directly formed onto the top surface of the waveguide 1302, e.g., as a combined monolithic structure and/or both formed of the same materials (even if not constructed out of the same monolithic structure). In this approach, the index of refraction of the gratings material is the same as the index of refraction of the waveguide 1302. The index of refraction n (or "refractive index") of a material describes how light propagates through that medium, and is defined as n=c/v, where c is the speed of light in vacuum and v is the phase velocity of light in the medium. The refractive index determines how much light is bent, or refracted, when entering a material.

Figure 13B:
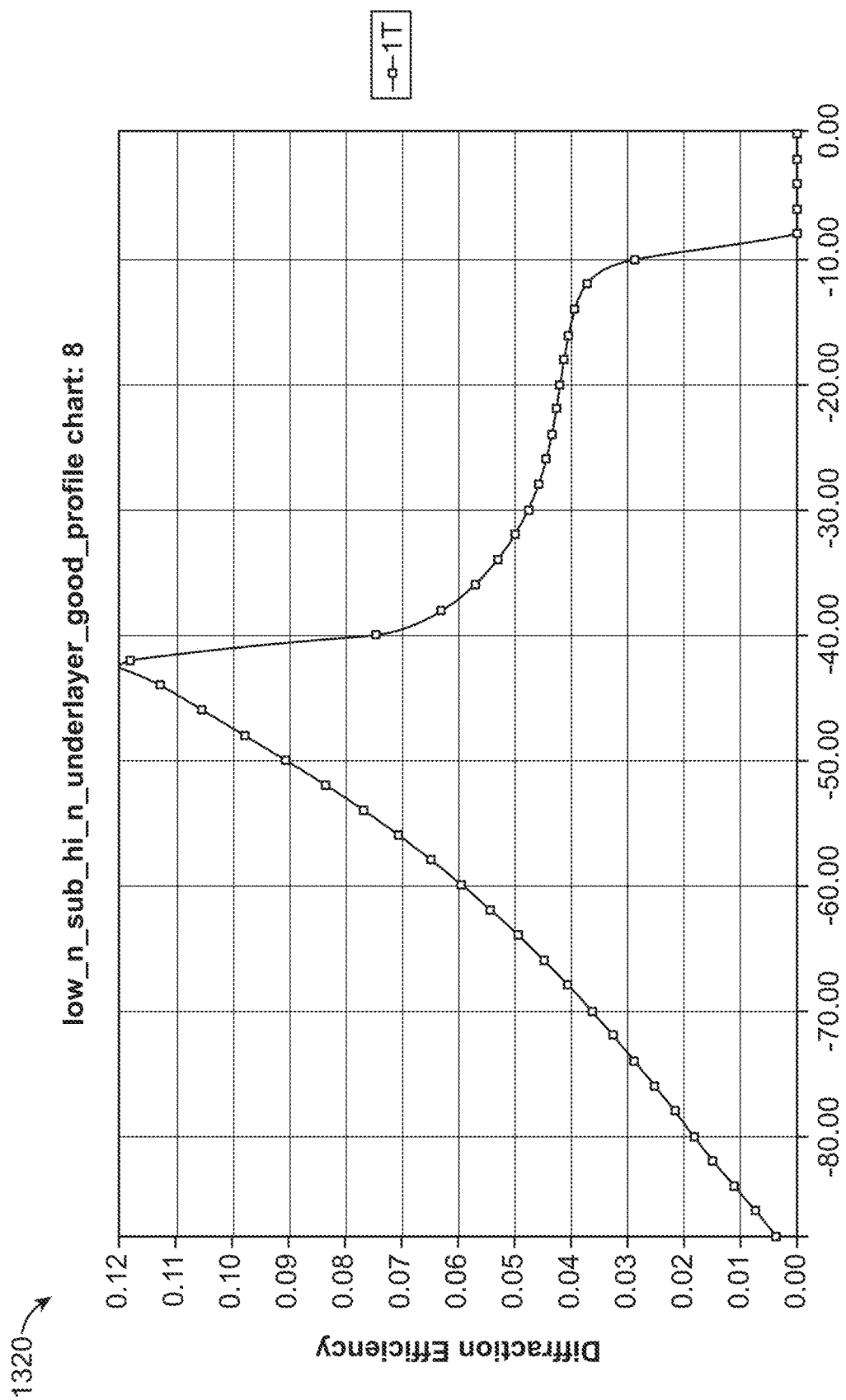
FIG. 13B shows a chart of example simulation results.

FIG. 13B shows a chart 1320 of example simulation results for a single polarization of the efficiency of the light coming out of the structure 1300 as a function of the angle at which the light is propagating within the waveguide. This chart shows that the diffraction efficiency of the outcoupled light for structure 1300 decreases at higher angles of incidence. As can be seen, at an angle of about 43 degrees, the efficiency drops relatively quickly on the depicted plot due to total internal reflectance variation based on incident angle in a medium with uniform index of refraction.

Figure 13C:
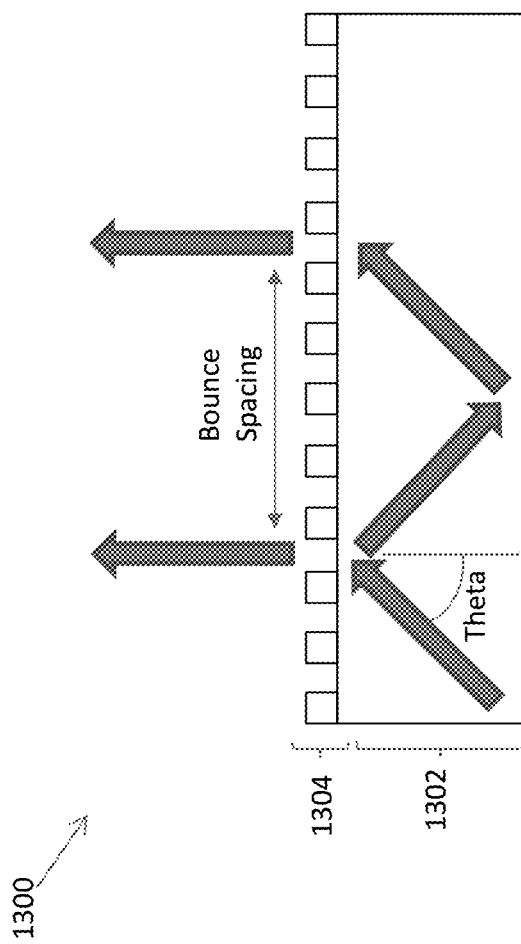
FIG. 13C shows an annotated version of FIG. 13A.

Therefore, it is possible that the usable range of configuration 1300 is somewhat limited and therefore undesirable, as the spacing of bounces may decrease at higher angles of incidence, which may further reduce the brightness seen by an observer at those angles. The diffraction efficiency is lower at the most shallow angles of incidence, which is not entirely desirable, because the bounce spacing (see FIG. 13C) between interactions with the top surface is fairly far apart, and light has fairly few opportunities to couple out. Thus, a dimmer signal with fewer outcoupled samples will result from this arrangement, with this problem being compounded by the grating having lower diffraction efficiencies at these high angles with this polarization orientation. It is noted that as used herein and in the figures, "1 T" refers to the $1^{st}$ transmitted diffracted order.

In some embodiments of waveguide-based optical systems or substrate guided optical systems, such as those described above, different pixels in a substrate-guided image are represented by beams propagating at different angles within the waveguide, where light propagates along the waveguide by total internal reflection (TIR). The range of beam angles that remain trapped in a waveguide by TIR is a function of the difference in refractive index between the waveguide and the medium (e.g., air) outside the waveguide; the higher the difference in refractive index, the larger the number of beam angles. In certain embodiments, the range of beam angles propagating along the waveguide correlates with the field of view of the image coupled out of the face of the waveguide by a diffractive element, and with the image resolution supported by the optical system. Additionally, the angle range in which total internal reflection occurs is dictated by the index of refraction of the waveguide—in some embodiments a minimum of about 43 degrees and a practical maximum of approximately 83 degrees, thus a 40 degree range.

Figure 14A:
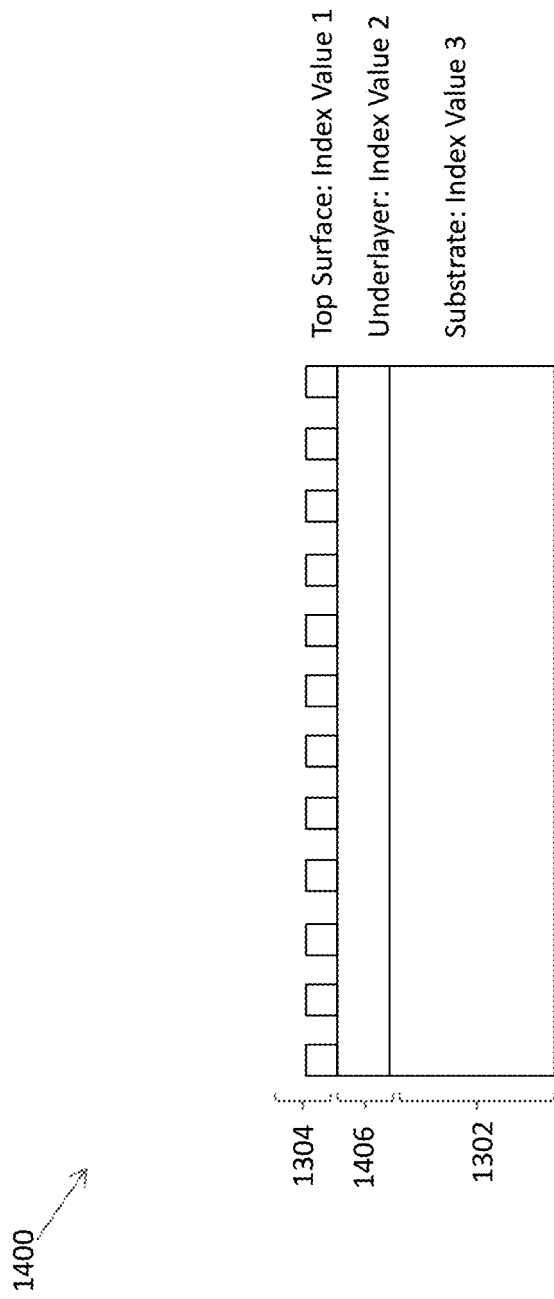
FIG. 14A illustrates an example approach to implement a diffraction structure having a waveguide substrate, an underlayer, and a top grating surface.

FIG. 14A illustrates an approach to address this issue according to some embodiments of the invention, where structure 1400 includes an intermediate layer 1406 (referred to herein as "underlayer 1406") that resides between the substrate 1302 and the top grating surface 1304. The top surface 1304 comprises a first material that corresponds to a first refractive index value, the underlayer 1406 comprises a second material that corresponds to a second refractive index value, and the substrate 1302 comprises a third material that corresponds to a third refractive index value. It is noted that any combination of same or different materials may be employed to implement each of these portions of structure 1400, e.g., where all three materials are different (and all three correspond to different refractive index values), or where two of the layers share the same material (e.g., where two of the three materials are the same and therefore share a common reflective index value that differs from the refractive index value of the third material). Any combination of refractive index values may be employed.

For example, one embodiment comprises a low refractive index for the underlayer, with higher index values for the surface grating and the substrate. Other example configurations are described below having other illustrative combinations of refractive index values. Any suitable set of materials may be used to implement structure 1500. For example, polymers, glass, and sapphire are all examples of materials that can be selected to implement any of the layers of structure 1400.

Figure 15A:
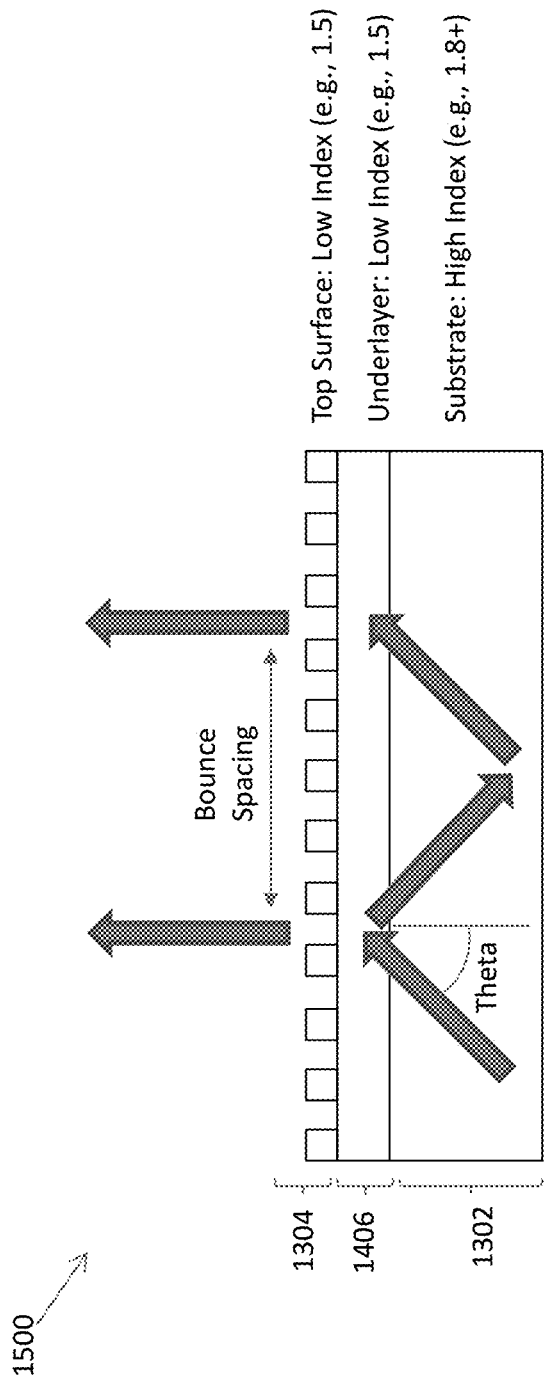
FIG. 15A illustrates an example approach to implement a diffraction structure having a high index waveguide substrate, a low index underlayer, and a low index top grating surface.

As shown in FIG. 15A, in some embodiments it may be desirable to implement a structure 1500 that uses a relatively higher refractive index substrate as waveguide substrate 1302, with a relatively lower refractive index underlayer 1406 and relatively lower refractive index top grating surface 1304. This is because one may be able to obtain a larger field of view by virtue of the fact that the lowest total internal reflection angle is reduced as the index of refraction is increased through the relationship $n1*\sin(theta1)=n2*\sin(90)$. For a substrate of index 1.5, the critical angle is 41.8 degrees; however, for a substrate index of 1.7, the critical angle is 36 degrees.

Gratings formed on higher index substrates may be utilized to couple light out even if they themselves have a lower index of refraction, so long as the layer of material comprising the grating is not too thick between the grating and the substrate. This is related to the fact that one can have a more broad range of angles for total internal reflection ("TIR") with such a configuration. In other words, the TIR angle drops to lower values with such a configuration. In addition, it is noted that many of the current etching processes may not be well suited for extending to high-index glasses. It is desirable in some embodiments to replicate an outcoupling layer reliably and inexpensively.

Figure 15B:
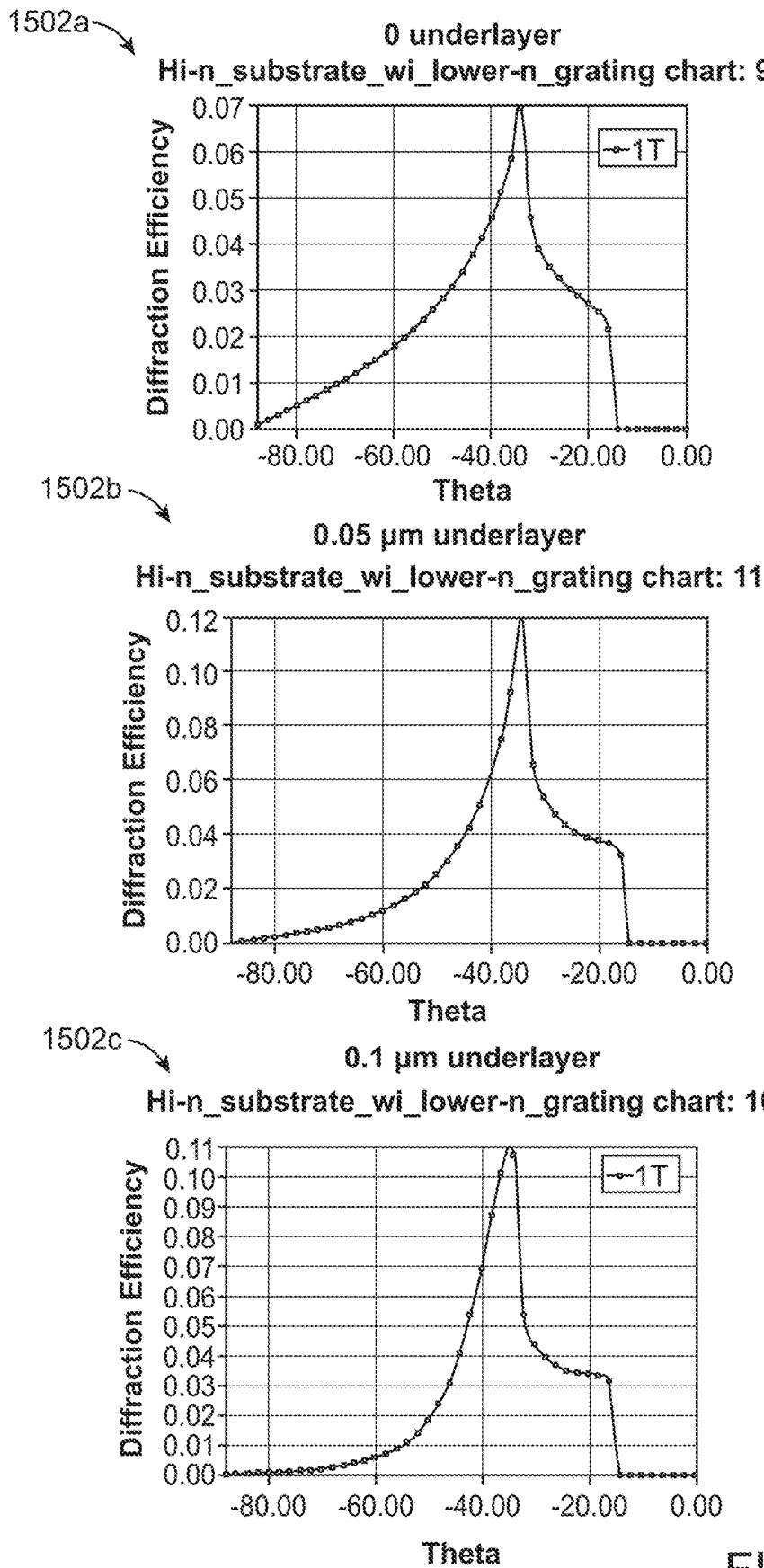
FIG. 15B shows charts of example simulation results.

The configuration of the underlayer 1406 may be adjusted to alter the performance characteristics of structure 1500, e.g., by changing the thickness of the underlayer 1406. The configuration of FIG. 15A (a construct including a grating structure 1304 on top comprising a relatively low index material, with an associated lower index underlayer 1406, and which also includes an associated high-index light guiding substrate 1302) may be modelled to result in data such as that depicted in FIG. 15B. Referring to this figure, the plot 1502a on the left is related to a configuration with zero-thickness underlayer 1502. The middle plot 1502b shows data for a 0.05 micron thickness underlayer 1502. The right plot 1502c shows data for a 0.1 micron thickness underlayer 1502.

As shown by the data in these plots, as the underlayer thickness is increased, the diffraction efficiency as a function of incident angle becomes much more nonlinear and suppressed at high angles, which may not be desirable. Thus in this case, control of the underlayer is an important functional input. However, it should be noted that with a zero-thickness underlayer and only grating features themselves possessing the lower index, the range of angles supported by the structure is governed by the TIR condition in the higher index base material, rather than the lower index grating feature material.

Figure 16A:
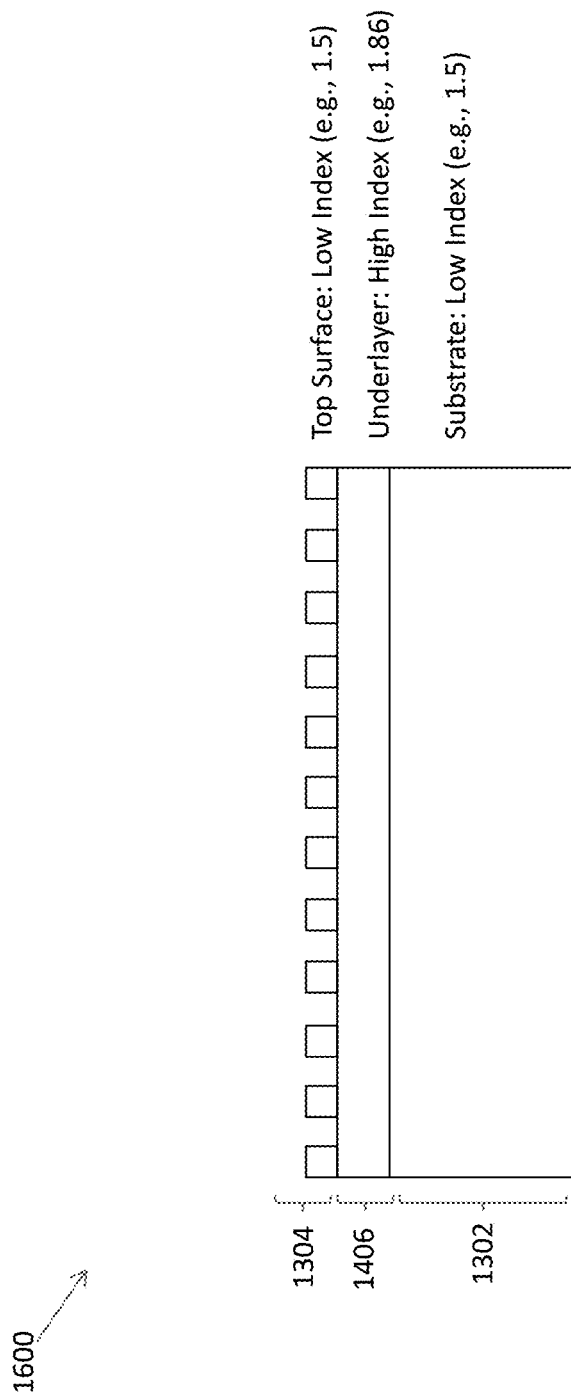
FIG. 16A illustrates an example approach to implement a diffraction structure having a low index waveguide substrate, a high index underlayer, and a low index top grating surface.

Referring to FIG. 16A, an embodiment of a structure 1600 is illustrated featuring a relatively high index underlayer 1406 on a lower index substrate 1302, with a top surface diffraction grating 1304 having a refractive index lower than the underlayer 1406 and comparable to, but not necessarily equal to, the refractive index of the substrate 1302. For example, the top surface grating may correspond to a refractive index of 1.5, the underlayer may correspond to a refractive index of 1.84, and the substrate may correspond to a refractive index of 1.5. Assume for this example that the period is 0.43 um and lambda corresponds to 0.532 um.

Figure 16B:
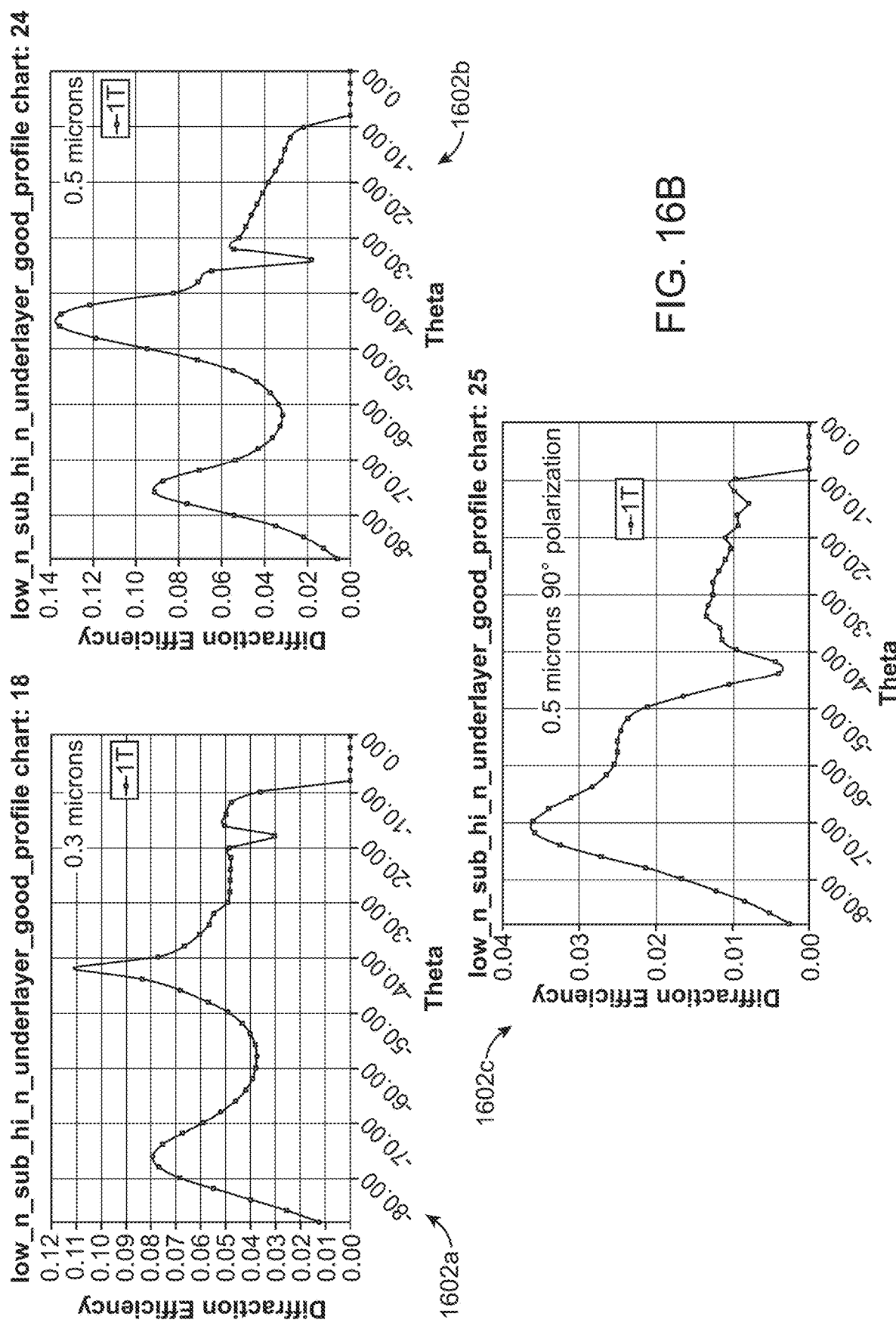
FIG. 16B shows charts of example simulation results.

Simulations related to such a configuration are presented in FIG. 16B. As shown in this figure in chart 1602a, with a 0.3 micron thick underlayer 1406, diffraction efficiency falls off like the previously described configuration, but then starts to rise up at the higher end of the angular range. This is also true for the 0.5 micron thick underlayer 1406 configuration, as shown in chart 1602b. It is beneficial in each of these (0.3 micron, 0.5 micron) configurations, that the efficiency is relatively high at the higher extremes of the angular range; such functionality may tend to counteract the more sparse bounce spacing concern discussed above. Also shown in this figure is chart 1602c for an embodiment featuring a 90 degree rotated polarization case, where the diffraction efficiency is lower as might be expected, but shows desirable behavior in that it provides greater efficiency at steeper angles as compared to shallower angles.

Indeed, in some embodiments, diffraction efficiency versus angles may increase at high angles. This may be a desirable feature for some embodiments since it helps to compensate for the lower bounce spacing that may occur at higher propagation angles. Therefore, the structural configuration of FIG. 16A may be preferable in embodiments where it is desirable to compensate for the lower bounce spacing (which occurs with higher propagation angles), since it promotes diffraction efficiency versus angle increasing at higher angles, which is desirable relative to the aforementioned monolithic configurations.

Figure 17A:
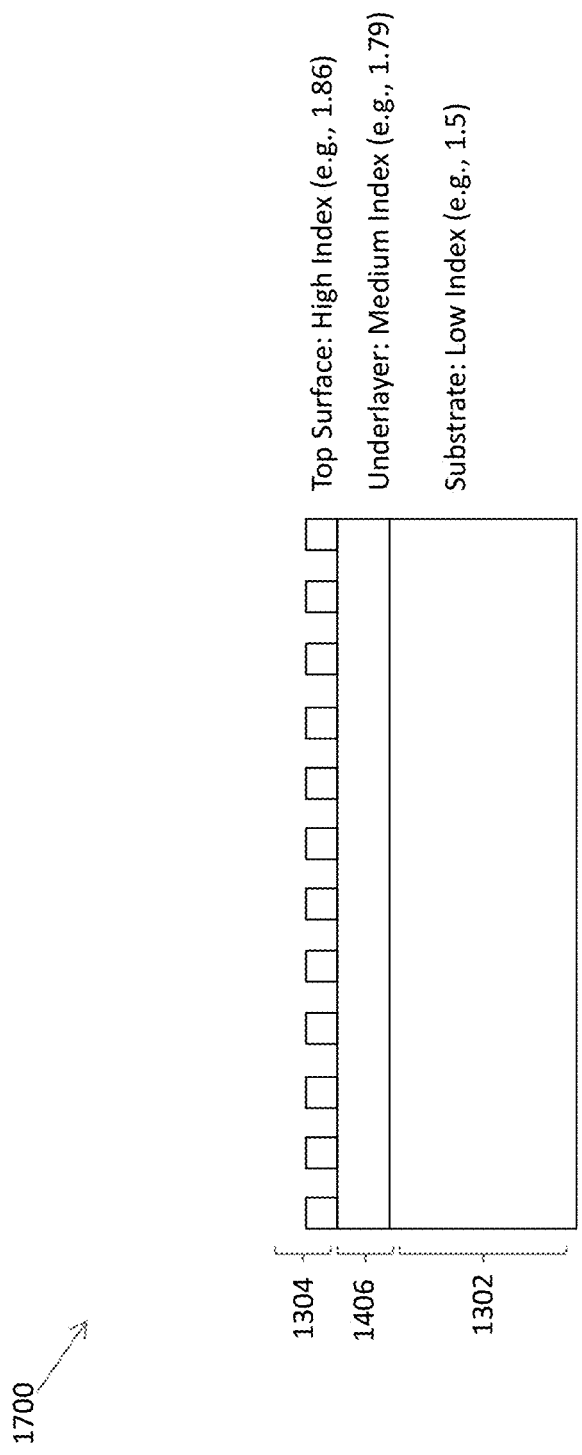
FIG. 17A illustrates an example approach to implement a diffraction structure having a low index waveguide substrate, a medium index underlayer, and a high index top grating surface.

Referring to FIG. 17A, another structure 1700 is depicted wherein an underlayer 1406 has a refractive index substantially higher than the refractive index of the substrate 1302. A grating structure 1304 is on top, and has a refractive index that is also higher than the refractive index of the underlayer 1406. For example, the top surface grating may correspond to a refractive index of 1.86, the underlayer may correspond to a refractive index of 1.79, and the substrate may correspond to a refractive index of 1.5. As before, assume for this example that the period is 0.43 um and lambda corresponds to 0.532 um.

Figure 17B:
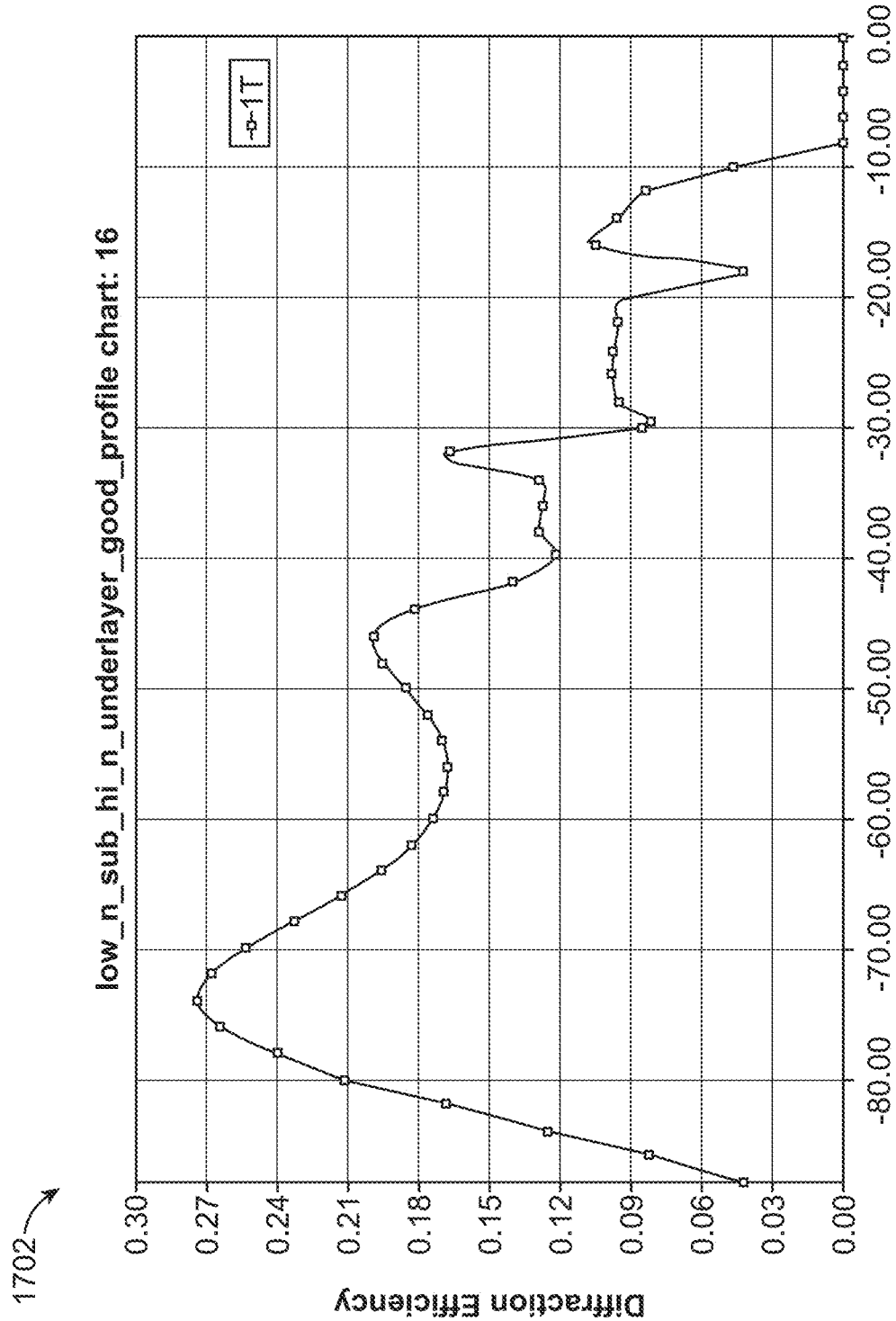
FIG. 17B shows a chart of example simulation results.

Referring to FIG. 17B, chart 1702 shows simulation data is illustrated for the structure 1700 of FIG. 17A. As shown in chart 1702, the plot of the resulting diffraction efficiency versus incident angle demonstrates a desirable general behavior to assist in compensating for the aforementioned lower bounce spacing at relatively high incident angles and possessing reasonable diffraction efficiency across a greater range of angles in general.

It is noted that the underlayer 1406 does not need to be uniform across the entire substrate. Any characteristic of the underlayer 1406 may be varied at different locations of the substrate, such as variances in the thickness, composition, and/or index of refraction of the underlayer 1406. One possible reason for varying the characteristics of the underlayer 1406 is to promote uniform display characteristics in the presence of known variations in either the display image and/or non-uniform transmission of light within the display system.

Figure 18A:
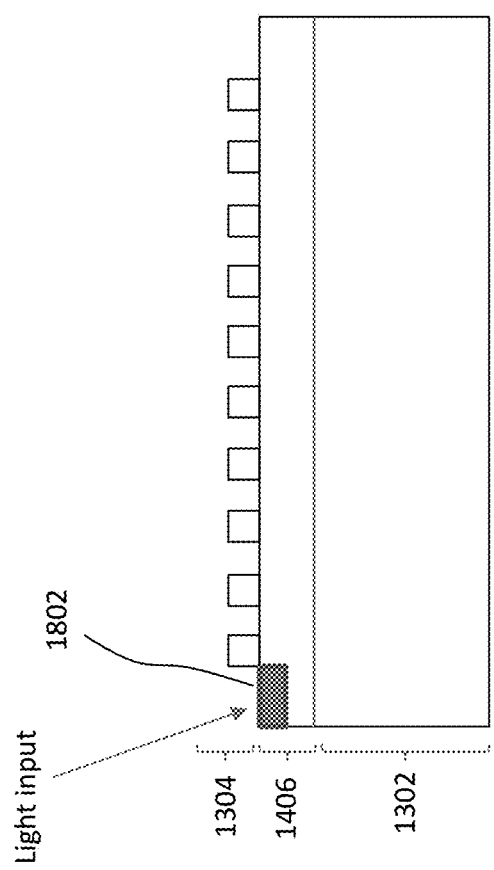

For example, as shown in FIG. 18A, consider if the waveguide structure receives incoming light at a single incoupling location 1802 on the waveguide. As the incoming light is injected into the waveguide 1302, less and less of that light will be remain as it progresses along the length of the waveguide 1302. This means that the output light near the incoupling location 1802 may end up appearing "brighter" than output light farther along the length of the waveguide 1302. If the underlayer 1406 is uniform along the entire length of the waveguide 1302, then the optical effects of the underlayer 1406 may reinforce this uneven brightness level across the substrate.

The characteristics of the underlayer 1406 can be adjusted across the substrate 1302 to make the output light more uniform. FIG. 18B illustrates an approach whereby the thickness of the underlayer 1406 is varied across the length of the waveguide substrate 1302, where the underlayer 1406 is thinner near the incoupling location 1802 and thicker at farther distances away from location 1802. In this manner, the effect of the underlayer 1406 to promote greater diffraction efficiency can at least partially ameliorate the effects of light losses along the length of the waveguide substrate 1302, thereby promoting more uniform light output across the entirety of the structure.

Figure 18C:
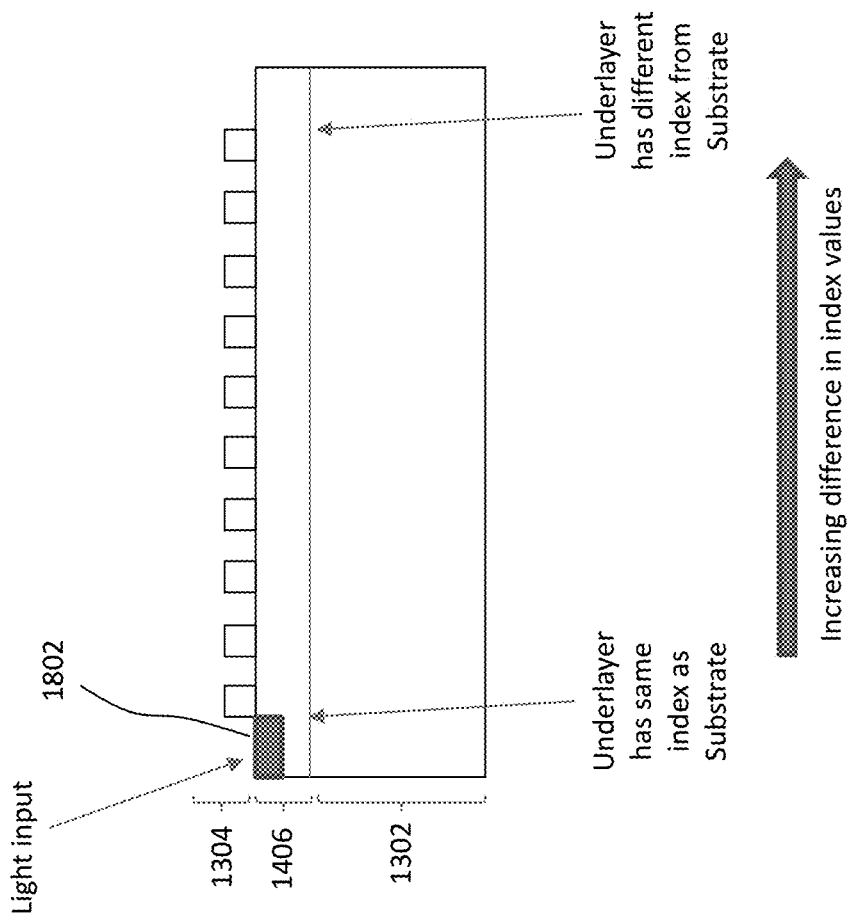
Figure 18D:
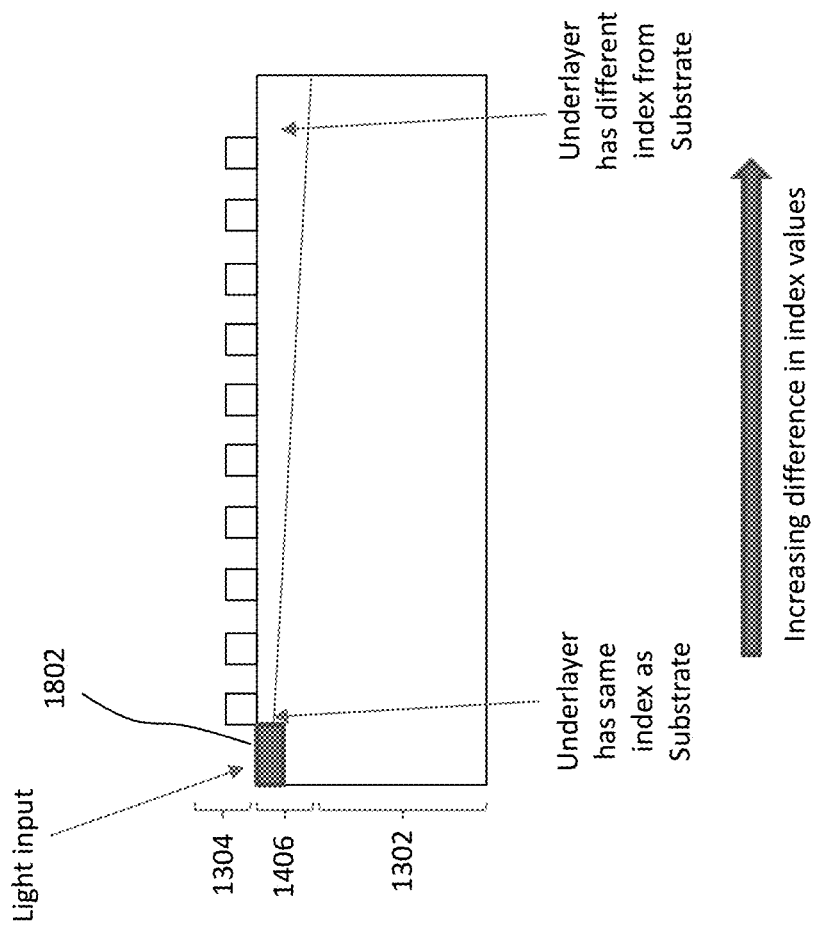

FIG. 18C illustrates an alternate approach where the thickness of the underlayer 1406 is not varied, but the refractive index of the underlayer 1406 varies across the substrate 1302. For example, to address the issue that output light near location 1802 tends to be brighter than locations farther away from location 1802, the index of refraction for the underlayer 1406 can be configured to be the same or similar to the substrate 1302 close to location 1802, but to have an increasing difference in those index values at locations farther away from location 1802. The composition of the underlayer 1406 material can be varied at different location to effect the different refractive index values. FIG. 18D illustrates a hybrid approach, whereby both the thickness and the refractive index of the underlayer 1406 is varied across the substrate 1302. It is noted that this same approach can be taken to vary the thickness and/or refractive index of the top grating surface 1304 and/or the substrate 1302 in conjunction with, or instead of, varying the underlayer 1406.

Thus a variety of combinations is available wherein an underlayer 1406 of one index is combined with a top grating 1304 of another index, along with a substrate 1302 of a third index, and wherein adjusting these relative values provides a lot of variation in dependence of diffraction efficiency upon incidence angle. A layered waveguide with different layers of refractive indices is presented. Various combinations and permutations are presented along with related performance data to illustrate functionality. The benefits include increased angle, which provides an increased output angle with the grating 1304 and therefore an increased field of view with the eyepiece. Further, the ability to counteract the normal reduction in diffraction efficiency with angle is functionally beneficial.

Figure 14B:
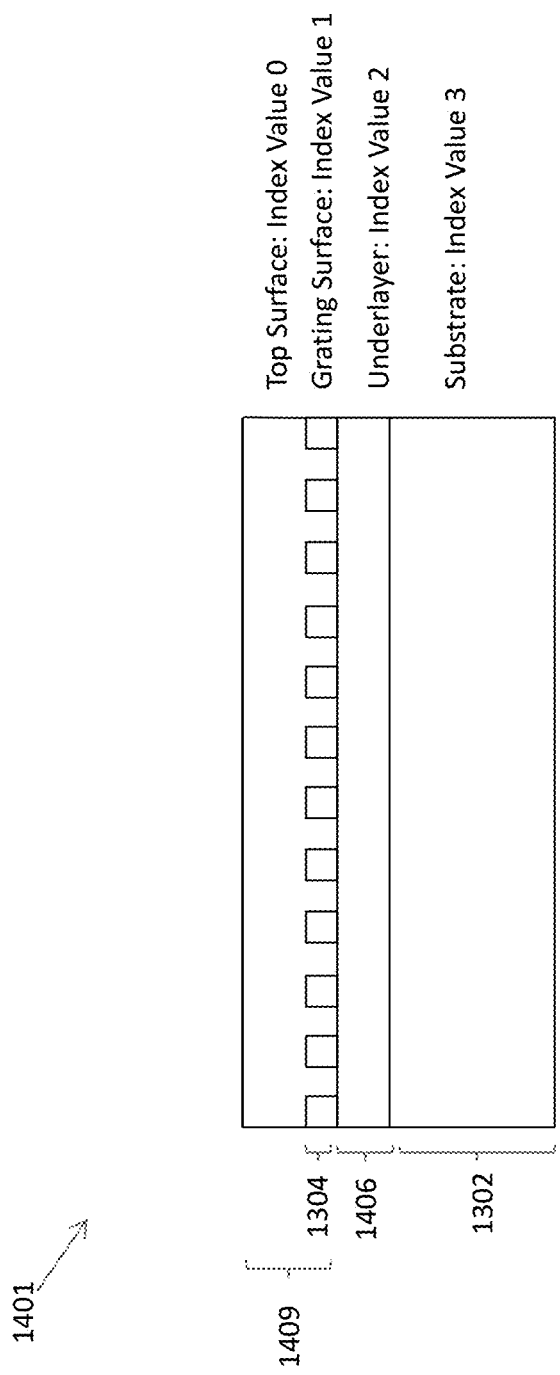
FIG. 14B illustrates an example approach to implement a diffraction structure having a waveguide substrate, an underlayer, a grating surface, and a top surface.
Figure 14C:
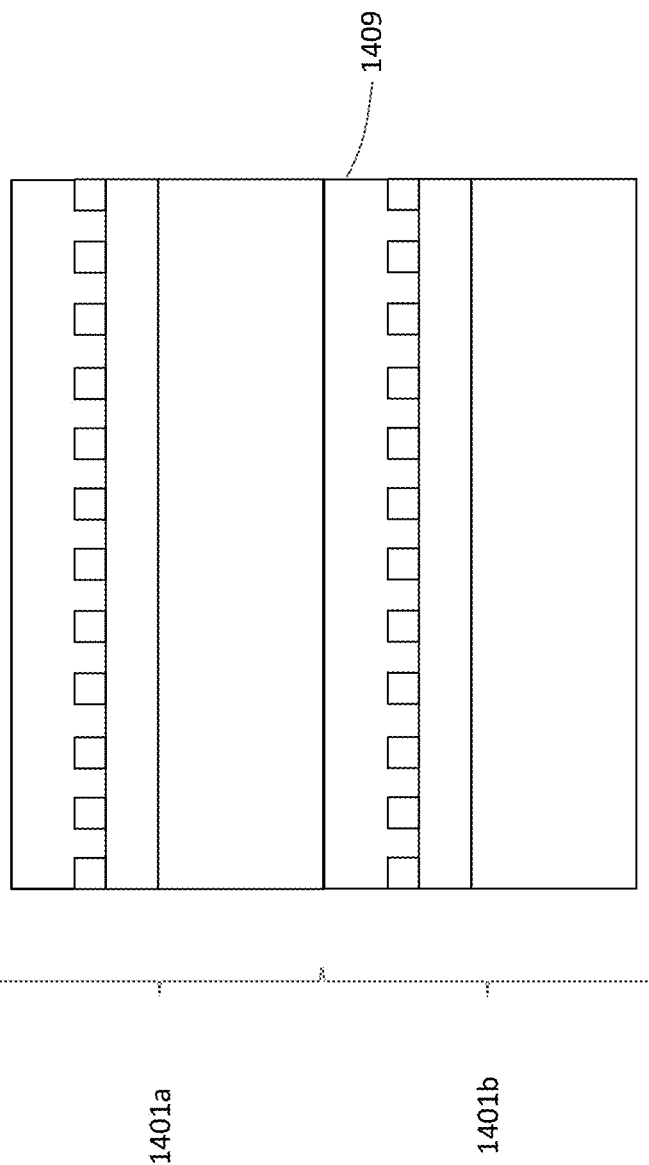
FIG. 14C illustrates an example approach to implement stacking of diffraction structures having a waveguide substrate, an underlayer, a grating surface, and a top surface.

FIG. 14B illustrates an embodiment where another layer of material 1409 (top surface) is placed above the grating layer 1304. Layer 1409 can be configurably implemented to address different design goals. For example, layer 1409 can form an interstitial layer between multiple stacked diffraction structures 1401a and 1401b, e.g., as shown in FIG. 14C. As shown in FIG. 14C, this interstitial layer 1409 can be employed to remove any air space/gap and provide a support structure for the stacked diffraction components. In this use case, the layer 1409 can be formed from a material having a relatively low index of refraction, e.g., at around 1.1 or 1.2. Although not shown in this figure, other layers (such as weak lenses) may also be placed between the diffraction structures 1401a and 1401b.

In addition, layer 1409 can be formed from a material having a relatively high index of refraction. In this situation, it is the gratings on the layer 1409 that would provide the diffraction effects for all or a substantial amount of the incident light, rather than the grating surface 1304.

As is clear, different relative combinations of refractive index values can be selected for the different layers, including layer 1409, to achieve desired optical effects and results.

Such structures may be manufactured using any suitable manufacturing techniques. Certain high-refractive index polymers such as one known as "MR 174" may be directly embossed, printed, or etched to produce desired patterned structures, although there may be challenges related to cure shrinkage and the like of such layers. Thus, in another embodiment, another material may be imprinted, embossed, or etched upon a high-refractive index polymer layer (i.e., such as a layer of MR 174) to produce a functionally similar result. Current state of the art printing, etching (i.e., which may include resist removal and patterning steps similar to those utilized in conventional semiconductor processes), and embossing techniques may be utilized and/or combined to accomplish such printing, embossing, and/or etching steps. Molding techniques, similar to those utilized, for example, in the production of DVDs, may also be utilized for certain replication steps. Further, certain jetting or deposition techniques utilized in printing and other deposition processes may also be utilized for depositing certain layers with precision.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The above description of illustrated embodiments is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other devices that implement virtual or AR or hybrid systems and/or which employ user interfaces, not necessarily the example AR systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with variations. For example, many of the methods may include additional acts, omit some acts, and/or perform acts in a different order than as illustrated or described.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An augmented reality (AR) display system for delivering augmented reality content to a user, comprising:
   an image-generating source to provide one or more frames of image data;
   a light modulator to transmit light associated with the one or more frames of image data; and
   a stacked waveguide assembly having a plurality of diffraction structures that are stacked together to receive the light associated with the one or more frames of image data and direct the light to the user's eyes,
   wherein each diffraction structure comprises
      a waveguide substrate,
      a surface grating,
      an underlayer disposed between the waveguide substrate and the surface grating, and
      a light injection location at one end of the diffraction structure, and
   wherein the underlayer has a non-uniform underlayer thickness.

2. The system of claim 1, further comprising a plurality of the image-generating sources to inject the image data into each of the plurality of diffraction structures within the stacked waveguide assembly.

3. The system of claim 1, where each diffraction structure further comprises a top layer over the surface grating.

4. The system of claim 3, wherein the top layer forms an interstitial layer for stacking of each diffraction structure.

5. The system of claim 4, wherein the interstitial layer is configured to a size of an air gap between adjacent diffraction structures.

6. The system of claim 4, wherein the interstitial layer is configured to provide a support structure for adjacent diffraction structures.

7. The system of claim 3, further comprising a top layer grating on the top layer.

8. The system of claim 1, wherein the waveguide substrate, the underlayer, and the surface grating are composed of different materials.

9. The system of claim 1, wherein the at least two of the waveguide substrate, the underlayer, and the surface grating are composed of the same material.

10. The system of claim 1, wherein the waveguide substrate, the underlayer, and the surface grating are composed of at least one of polymer material, sapphire, or glass.

11. The system of claim 1, wherein the DOE is switchable between an ON state and an OFF state.

12. The system of claim 1, embodied as a head-mountable wearable system.

13. The system of claim 1, wherein the waveguide substrate has a waveguide refractive index, and the underlayer has an underlayer diffractive index that is different from the waveguide refractive index.

14. The system of claim 1, wherein the surface grating has a surface grating refractive index.

15. The system of claim 14, wherein at least two of the waveguide refractive index, the underlayer refractive index, and the surface grating refractive index are equal to each other at a point along the length of the diffraction structure.

16. The system of claim 14, wherein the waveguide refractive index, the underlayer refractive index, and the surface grating refractive index are equal to each other at the point along the length of the diffraction structure.

17. An augmented reality (AR) display system for delivering augmented reality content to a user, comprising:
    an image-generating source to provide one or more frames of image data;
    a light modulator to transmit light associated with the one or more frames of image data; and
    a stacked waveguide assembly having a plurality of diffraction structures that are stacked together to receive the light associated with the one or more frames of image data and direct the light to the user's eyes,
    wherein each diffraction structure comprises
        a waveguide substrate,
        a surface grating,
        an underlayer disposed between the waveguide substrate and the surface grating, and
        a light injection location at one end of the diffraction structure,
    wherein the waveguide substrate has a waveguide refractive index, and the underlayer has an underlayer diffractive index that is different from the waveguide refractive index, and
    wherein the underlayer has a non-uniform underlayer refractive index that changes from being relatively similar to the waveguide refractive index to being increasingly different from the waveguide refractive index as distance is increased from a light injection location, such that the non-uniform refractive index of the underlayer at least partially compensates for the decrease in intensity of the light as it propagates from the light injection location along the length of the diffraction structure.

18. An augmented reality (AR) display system for delivering augmented reality content to a user, comprising:
    an image-generating source to provide one or more frames of image data;
    a light modulator to transmit light associated with the one or more frames of image data; and
    a stacked waveguide assembly having a plurality of diffraction structures that are stacked together to receive the light associated with the one or more frames of image data and direct the light to the user's eyes,
    wherein each diffraction structure comprises
        a waveguide substrate,
        a surface grating,
        an underlayer disposed between the waveguide substrate and the surface grating, and
        a light injection location at one end of the diffraction structure,
    wherein the surface grating has a surface grating refractive index, and
    wherein the waveguide refractive index, the underlayer refractive index, and the surface grating refractive index are different from each other at all points along the length of the diffraction structure.

* * * * *